(12) United States Patent
Ha et al.

(10) Patent No.: US 10,819,133 B2
(45) Date of Patent: Oct. 27, 2020

(54) DEVICE FOR PERFORMING WIRELESS CHARGING AND METHOD THEREOF

(71) Applicant: Samsung Electronics Co., Ltd., Gyeonggi-do (KR)

(72) Inventors: Young Mi Ha, Gyeonggi-do (KR); Gil Young Noh, Gyeonggi-do (KR); Byung Wook Kim, Gyeonggi-do (KR); Jung Min Lee, Gyeonggi-do (KR); Jae Mu Ha, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/587,204

(22) Filed: Sep. 30, 2019

(65) Prior Publication Data

US 2020/0028376 A1    Jan. 23, 2020

Related U.S. Application Data

(63) Continuation of application No. 15/800,278, filed on Nov. 1, 2017, now Pat. No. 10,432,012.

(30) Foreign Application Priority Data

Nov. 1, 2016    (KR) ........................ 10-2016-0144535

(51) Int. Cl.
*H02J 7/02* (2016.01)
*H02J 50/80* (2016.01)
*H02J 50/90* (2016.01)
*H02J 50/10* (2016.01)
*H02J 7/00* (2006.01)
*H02J 7/34* (2006.01)
(Continued)

(52) U.S. Cl.
CPC ........... *H02J 7/025* (2013.01); *H01M 10/488* (2013.01); *H02J 7/0047* (2013.01); *H02J 7/342* (2020.01); *H02J 50/10* (2016.02); *H02J 50/12* (2016.02); *H02J 50/20* (2016.02); *H02J 50/80* (2016.02); *H02J 50/90* (2016.02); *H05K 5/0017* (2013.01)

(58) Field of Classification Search
USPC ....................................................... 320/108
See application file for complete search history.

(56) References Cited

U.S. PATENT DOCUMENTS

| | | |
|---|---|---|
| 7,791,311 B2 | 9/2010 | Sagoo |
| 9,407,333 B2 | 8/2016 | Phillips et al. |

(Continued)

FOREIGN PATENT DOCUMENTS

KR    10-2013-0035560 A    4/2013

*Primary Examiner* — Mohammed Alam
(74) *Attorney, Agent, or Firm* — Cha & Reiter, LLC

(57) ABSTRACT

An electronic device is disclosed. The disclosed electronic device includes a display, a charging circuit that transmits and receives power to and from an external electronic device, a sensor circuit that senses a spatial relationship of the electronic device with the external electronic device, a processor that is electrically connected with the display, the charging circuit, and the sensor circuit. When wirelessly transmitting or receiving power to or from the external electronic device using the charging circuit, the processor may transmit and receive information associated with the wireless transmission or reception of power and display the information based on the spatial relationship.

20 Claims, 14 Drawing Sheets

(51) Int. Cl.
    *H02J 50/12*     (2016.01)
    *H02J 50/20*     (2016.01)
    *H01M 10/48*     (2006.01)
    *H05K 5/00*     (2006.01)

(56) References Cited

U.S. PATENT DOCUMENTS

| | | |
|---|---|---|
| 9,843,213 B2 | 12/2017 | Leabman et al. |
| 2007/0103110 A1 | 5/2007 | Sagoo |
| 2013/0065614 A1* | 3/2013 | Jung ................. H04M 1/72522 455/456.3 |
| 2013/0082650 A1 | 4/2013 | Lee et al. |
| 2014/0091626 A1* | 4/2014 | Walley ................... H02J 50/40 307/43 |
| 2014/0191709 A1 | 7/2014 | Celentano et al. |
| 2015/0042264 A1 | 2/2015 | Leabman et al. |
| 2015/0162781 A1 | 6/2015 | Fratti et al. |
| 2015/0168309 A1 | 6/2015 | Goethel |
| 2015/0220299 A1* | 8/2015 | Kim ...................... G06F 3/0488 345/1.3 |
| 2015/0244185 A1 | 8/2015 | Won et al. |
| 2016/0126779 A1 | 5/2016 | Park |
| 2016/0127011 A1 | 5/2016 | Phillips et al. |
| 2016/0190861 A1 | 6/2016 | Cha |
| 2017/0133881 A1* | 5/2017 | Cho ....................... H02J 50/15 |
| 2017/0163076 A1 | 6/2017 | Park et al. |
| 2018/0123379 A1* | 5/2018 | Ha .......................... H02J 7/025 |
| 2018/0242242 A1* | 8/2018 | Lee ..................... H04W 52/027 |
| 2019/0006891 A1* | 1/2019 | Park ........................ H04W 4/80 |
| 2020/0028376 A1* | 1/2020 | Ha ....................... H02J 7/0047 |

\* cited by examiner

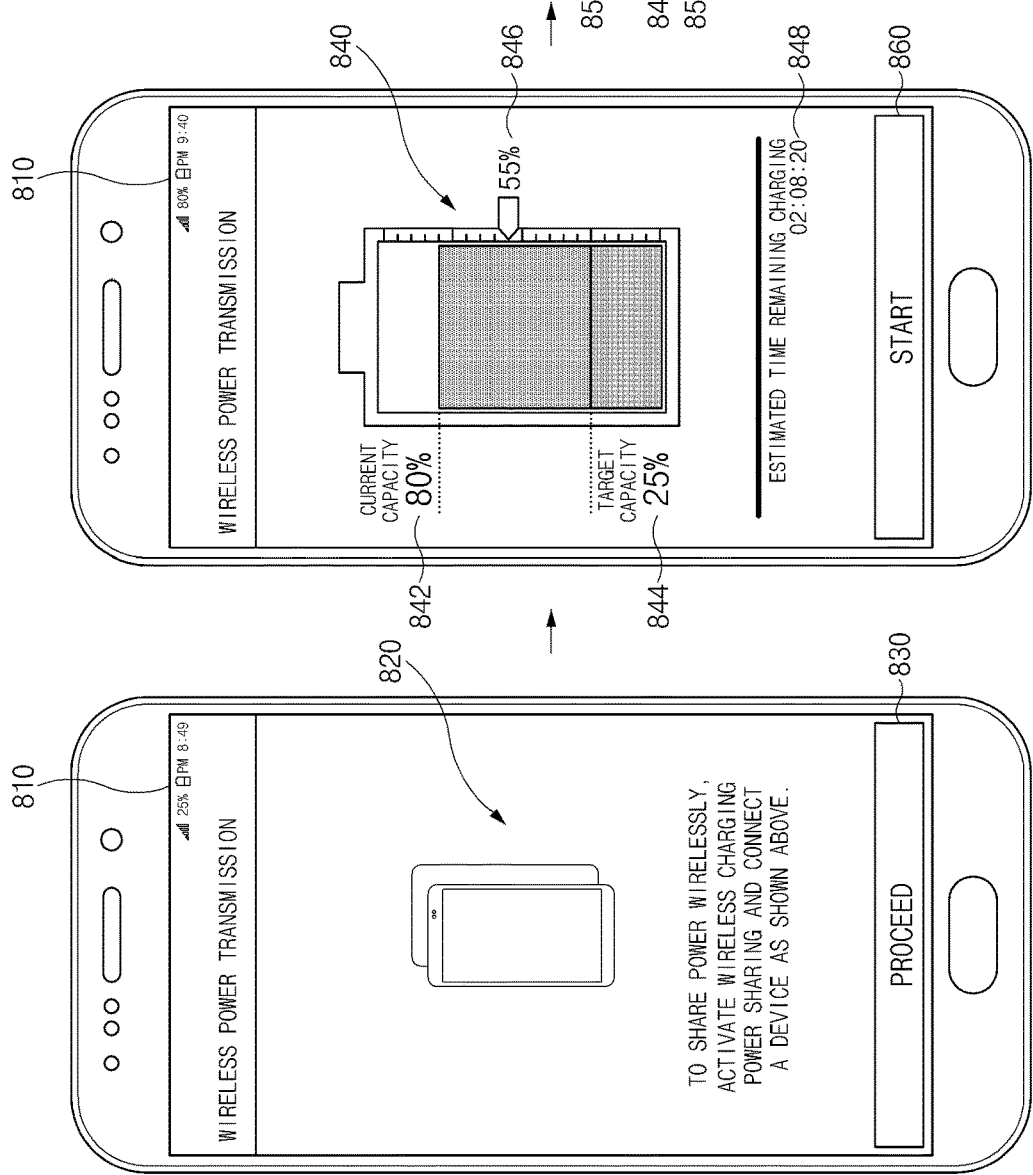

DEVICE FOR PERFORMING WIRELESS CHARGING AND METHOD THEREOF

CROSS-REFERENCE TO RELATED APPLICATIONS

This application is a Continuation of U.S. patent application Ser. No. 15/800,278 filed on Nov. 1, 2017 which under 35 U.S.C. § 119(a) from a Korean patent application filed on Nov. 1, 2016 in the Korean Intellectual Property Office and assigned Serial number 10-2016-0144535, the entire disclosure of which is hereby incorporated by reference.

TECHNICAL FIELD

The present disclosure generally relates to an electronic device and a method for performing wireless charging.

BACKGROUND

With the development of various information communication technologies, mobile electronic device have been increasingly deployed. These electronic devices receive and transmit data to and from other external electronic devices through communication networks, thus providing the user with mobile data communication services.

Under the recent trend of the digital convergence, various types of mobile devices have been developed. For example, one type of device called the smartphone supports various functions such as connecting to the Internet, voice calling, health monitoring, media playback, image and video capture via a camera, etc.

Due to this multitude of functions, smartphones are generally usually carried by the user and are often used throughout the day. For this reason, the battery life of the electronic device becomes an important issue. When the user is concerned that battery power may be depleted while the user is mobile, he or she may carry a charging device such as a portable charger along with the electronic device. This may be inconvenient to the user.

SUMMARY

Various embodiments of the present disclosure provide an electronic device and a method for performing wireless charging. In detail, the electronic device may transmit and receive power to and from another external electronic device. To transmit and receive the power, charging coils that are respectively provided in the electronic device and the external electronic device. To transmit power, the charging coils are aligned with each other.

The charging coil may be arranged adjacent to a rear surface of each electronic device for efficiency. When transmitting power, the rear surfaces of the electronic device and external electronic device may face each other. Accordingly, when transmitting power, the displays of the electronic device and the external electronic device face opposite directions. Thus, when the electronic device and the external electronic device are exchanging power and are placed on a surface such as a table, the user may not be able to see the display of the electronic device if the electronic device is placed under external electronic device. This may make it difficult for the user to verify that the electronic device is charging. Accordingly, an advantage of the present disclosure is allowing the user to easily view information related to the wireless charging.

An electronic device according to one embodiment may include a display, a charging circuit that transmits and receives power to and from an external electronic device, a sensor circuit that senses a spatial relationship of the electronic device with the external electronic device, a processor that is electrically connected with the display, the charging circuit, and the sensor circuit. When wirelessly transmitting or receiving power to or from the external electronic device using the charging circuit, the processor may transmit and receive information associated with the wireless transmission or reception of power and display the information based on the spatial relationship.

In the electronic device according to one embodiment, the information may include at least one of a battery level of the electronic device, an amount of power consumed by the electronic device, a temperature of the electronic device, when the wireless transmission or reception of power started, an estimated time for completing the wireless transmission or reception of power, a charging current of the electronic device, and time elapsed since a start of the wireless transmission or reception of power.

In the electronic device according to one embodiment, the displayed information may include information generated by the electronic device and information received from the external electronic device.

In the electronic device according to one embodiment, a first frequency used to wirelessly transmit or receive power is different from a second frequency used to transmit and receive the information.

In the electronic device according to one embodiment, the processor may not display the information if, based on the spatial relationship, the processor determines that the display is obscured from a user.

In the electronic device according to one embodiment, if the electronic device transmits power to the external electronic device, the processor may execute only a pre-defined application.

In the electronic device according to one embodiment, if the electronic device transmits power to the external electronic device, the processor may enter a low-power mode to execute only one or more pre-defined functions.

In the electronic device according to one embodiment, if the electronic device transmits power to the external electronic device, the processor may display, in the display, a first user interface displaying at least one of a current power capacity of the electronic device, a target capacity remaining after the wireless transmission of power is completed, a progress indicator, and an estimated time remaining for the wireless transmission of power.

In the electronic device according to one embodiment, if the electronic device receives power from the external electronic device, the processor may display, in the display, a second user interface displaying at least one of a current power capacity of the external electronic device, a target capacity remaining after the wireless transmission of power is completed, and an estimated time remaining for the wireless transmission of power.

In the electronic device according to one embodiment, the processor may adjust the target capacity based on an input from a user.

A control method of an electronic device including a display according to one embodiment may include wirelessly transmitting or receiving power to or from an external electronic device, sensing a spatial relationship of the electronic device with the external electronic device, transmitting and receiving information associated with the wireless transmission or reception of power, and displaying the information based on the spatial relationship.

In the control method of the electronic device including the display according to one embodiment, the information may include at least one of a battery level of the electronic device, an amount of power consumed by the electronic device, a temperature of the electronic device, when the wireless transmission or reception of power started, an estimated time for completing the wireless transmission or reception of power, a charging current of the electronic device, and time elapsed since a start of the wireless transmission or reception of power.

In the control method of the electronic device including the display according to one embodiment, the displayed information may include information generated by the electronic device and information received from the external electronic device.

In the control method of the electronic device including the display according to one embodiment, the method may include not displaying the information if, based on the spatial relationship, the display is determined to be obscured from a user.

In the control method of the electronic device including the display according to one embodiment, if the electronic device transmits power to the external electronic device, the method may include executing only a pre-defined application.

In the control method of the electronic device including the display according to one embodiment, if the electronic device transmits power to the external electronic device, the method may include entering a low-power mode to execute only one or more pre-defined functions.

In the control method of the electronic device including the display according to one embodiment, if the electronic device transmits power to the external electronic device, the method may include displaying, in the display, a first user interface displaying at least one of a current power capacity of the electronic device, a target capacity remaining after the wireless transmission of power is completed, a progress indicator, and an estimated time remaining for the wireless transmission of power.

In the control method of the electronic device including the display according to one embodiment, if the electronic device receives power from the external electronic device, the method may include displaying, in the display, a second user interface displaying at least one of a current power capacity of the external electronic device, a target capacity remaining after the wireless transmission of power is completed, and an estimated time remaining for the wireless transmission of power.

In the control method of the electronic device including the display according to one embodiment, the method may include adjusting the target capacity based on an input from a user.

According to one embodiment, a recording medium may stores instructions for an electronic device including a display, where the instructions, when executed by a processor of the electronic device, performs the operations of wirelessly transmitting or receiving power to or from an external electronic device, sensing a spatial relationship of the electronic device with the external electronic device, transmitting and receiving information associated with the wireless transmission or reception of power, and displaying the information based on the spatial relationship.

An electronic device and a control method according to one or more embodiments of the present disclosure may display information associated with wireless charging of external electronic device when the display of the external electronic device is not viewable by the user because it is obscured by a surface such as a table or the like, during when wireless power is transmitted between the electronic device and the external electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8A, FIG. 8B and FIG. 8C are views illustrating various user interfaces when a first electronic device according to one embodiment activates wireless charging;

Throughout the drawings, it should be noted that like reference numbers are used to depict the same or similar elements, features, and structures.

DETAILED DESCRIPTION

Figure 1:
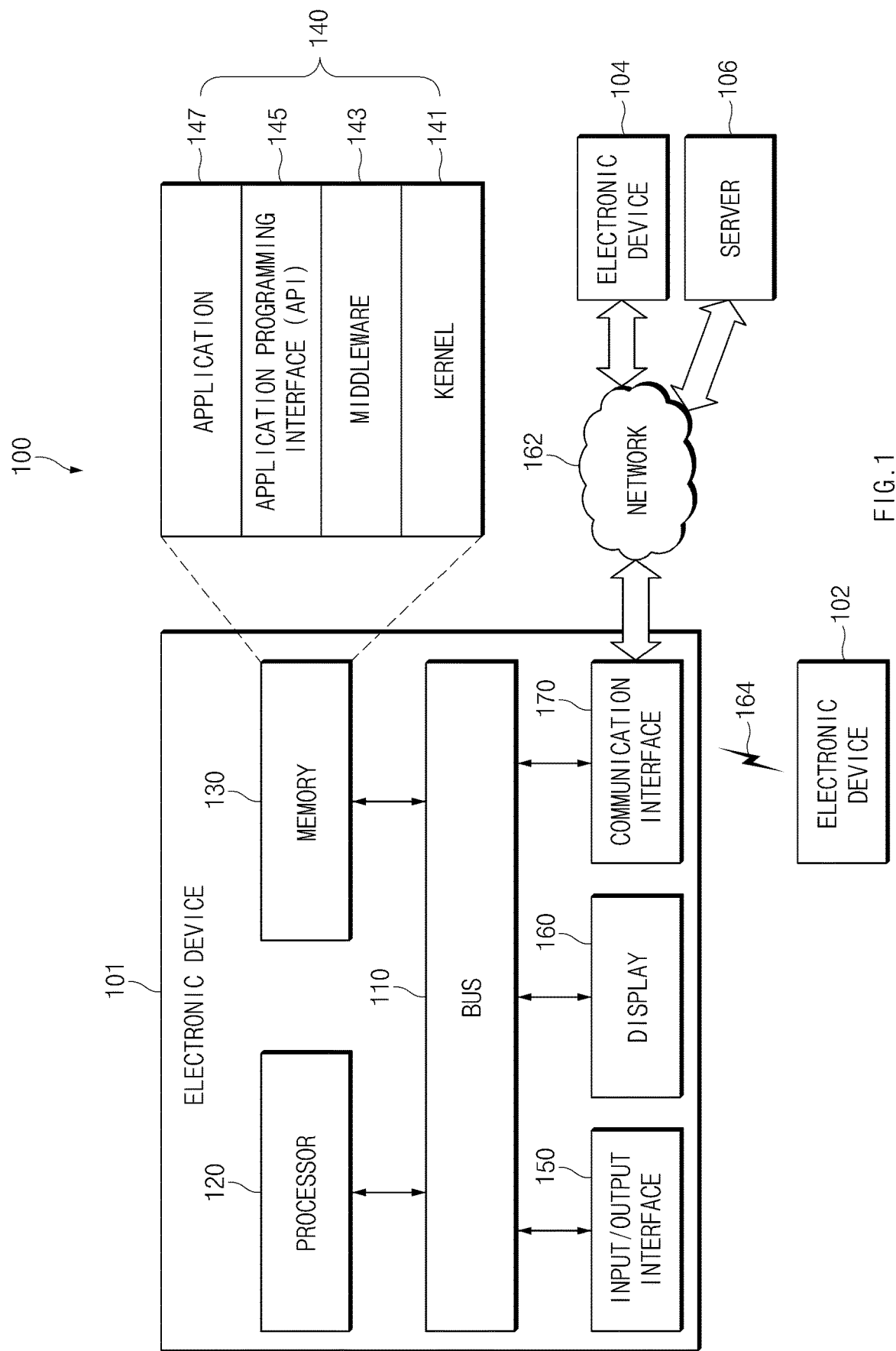
FIG. 1 is a block diagram of an electronic device in a network environment according to one embodiment.

Hereinafter, various embodiments of the present disclosure may be described with reference to accompanying drawings. Accordingly, those of ordinary skill in the art will recognize that modification, equivalent, and/or alternative on the various embodiments described herein can be made without departing from the scope and spirit of the present disclosure. With regard to description of drawings, similar elements may be marked by similar reference numerals. Singular forms of terms may include corresponding plural forms unless otherwise specified. In this disclosure, the expressions "A or B," "at least one of A or/and B," or "one or more of A or/and B," and the like may include any and all combinations of one or more of the associated listed items. Terms such as "first," "second," and the like may be used to refer to various elements regardless of the order and/or the priority and to distinguish the relevant elements from other elements, but do not limit the elements. When an element (e.g., a first element) is referred to as being "(operatively or communicatively) coupled with/to" or "connected to" another element (e.g., a second element), the element may be directly coupled with/to or connected to the other element or an intervening element (e.g., a third element) may be present.

According to the situation, the expression "configured to" used in this disclosure may be used as, for example, the expression "suitable for," "having the capacity to," "adapted to," "made to," "capable of," or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing the recited operations or a generic-purpose processor (e.g., a central processing unit (CPU) or an application processor) which performs the operations by executing one or more software programs which are stored in a memory device.

An electronic device according to various embodiments of this disclosure may be, for example, smartphones, tablet personal computers (PCs), mobile phones, video telephones, electronic book readers, desktop PCs, laptop PCs, netbook computers, personal digital assistants (PDAs), portable multimedia players (PMI's), Motion Picture Experts Group (MPEG-1 or MPEG-2) Audio Layer 3 (MP3) players, medical devices, cameras, or wearable devices. According to various embodiments, the wearable device may be an accessory (e.g., watches, rings, bracelets, anklets, necklaces, glasses, contact lens, or head-mounted-devices (HMDs), a fabric or garment-integrated device (e.g., an electronic apparel), a body-attached device (e.g., a skin pad or tattoos), or a bio-implantable device (e.g., an implantable circuit). According to various embodiments, the electronic device may be, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to other embodiments, the electronic device may be various medical devices (e.g., various portable medical measurement devices (e.g., blood glucose monitoring devices, heartbeat measuring devices, blood pressure measuring devices, body temperature measuring devices, and the like), magnetic resonance angiography (MRA) devices, magnetic resonance imaging (MRI) devices, computed tomography (CT) devices, scanners, and ultrasonic devices), navigation devices, Global Navigation Satellite Systems (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, drones, automatic teller's machines (ATMs), points of sale systems (POSs), or Internet of Things devices (e.g., light bulbs, various sensors, sprinkler devices, fire alarms, thermostats, street lamps, toasters, exercise equipment, hot water tanks, heaters, boilers, and the like). According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be a flexible electronic device or a combination of two or more above-described devices. Furthermore, an electronic device according to an embodiment of this disclosure may not be limited to the above-described electronic devices. In this disclosure, the term "user" may refer to a person who uses an electronic device or may refer to a device (e.g., an artificial intelligence electronic device) that uses the electronic device.

Referring to FIG. 1, according to one embodiment, an electronic device 101 in a network environment is described. The electronic device 101 may include a bus 110, a processor 120, a memory 130, an input/output interface 150, a display 160, and a communication interface 170. According to an embodiment, the electronic device 101 may not include at least one of the above-described elements or may further include other element(s). The bus 110 may interconnect the above-described elements 110 to 170 and may include a circuit for conveying communications (e.g., a control message and/or data) among the above-described elements. The processor 120 may include one or more of a central processing unit (CPU), an application processor (AP), or a communication processor (CP). For example, the processor 120 may perform an arithmetic operation or data processing associated with control and/or communication of at least other elements of the electronic device 101. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)". For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data. Furthermore, the middleware 143 may process one or more task requests received from the application program 147 according to a priority. For example, the middleware 143 may assign the priority, which makes it possible to use system resources (e.g., the bus 110, the processor 120, the memory 130, or the like) of the electronic device 101, to at least one of the application program 147 and may process the one or more task requests. The API 145 may be an interface through which the application program 147 controls a function provided by the kernel 141 or the middleware 143, and may include, for example, at least one interface or function (e.g., an instruction) for a file control, a window control, image processing, a character control, or the like. The input/output interface 150 may transmit an instruction or data input from a user or another external device, to other element(s) of the electronic device 101 or may output an instruction or data, received from other element(s) of the electronic device 101, to a user or another external device.

The display 160 may be, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering inputs using an electronic pen or a part of the user's body. The communication interface 170 may establish communication between the electronic device 101 and an external device (e.g., the first electronic device 102, the second electronic device 104, or the server 106). For example, the communication interface 170 may be connected to the network 162 over wireless communication or wired communication to communicate with the external device (e.g., the second electronic device 104 or the server 106).

For example, the wireless communication may include cellular communication using at least one of long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. The wireless communication may include at least one of wireless fidelity (Wi-Fi), Bluetooth, Bluetooth low energy (BLE), Zigbee, near field communication (NFC), magnetic stripe transmission (MST), radio frequency (RF), a body area network, or the like. According to an embodiment, the wireless communication may include GNSS. The GNSS may be one of, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), powerline communication, a plain old telephone service (POTS), or the like. The network 162 may include at least one of telecommunications networks, for example, a computer network (e.g., LAN or WAN), an Internet, or a telephone network.

Each of the first and second electronic devices 102 and 104 may be different from or the same as that of the electronic device 101. According to various embodiments, all or a portion of operations that the electronic device 101 will perform may be executed by another electronic device (e.g., the first electronic device 102, the second electronic device 104 or the server 106). According to an embodiment, in the case where the electronic device 101 executes a function or service automatically or in response to a request, the electronic device 101 may not perform the function or the service internally, but, alternatively or additionally, it may request at least a portion of the function or service be performed by another electronic device (e.g., the electronic device 102 or 104 or the server 106). The other electronic device (e.g., the electronic device 102 or 104 or the server 106) may execute the requested function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
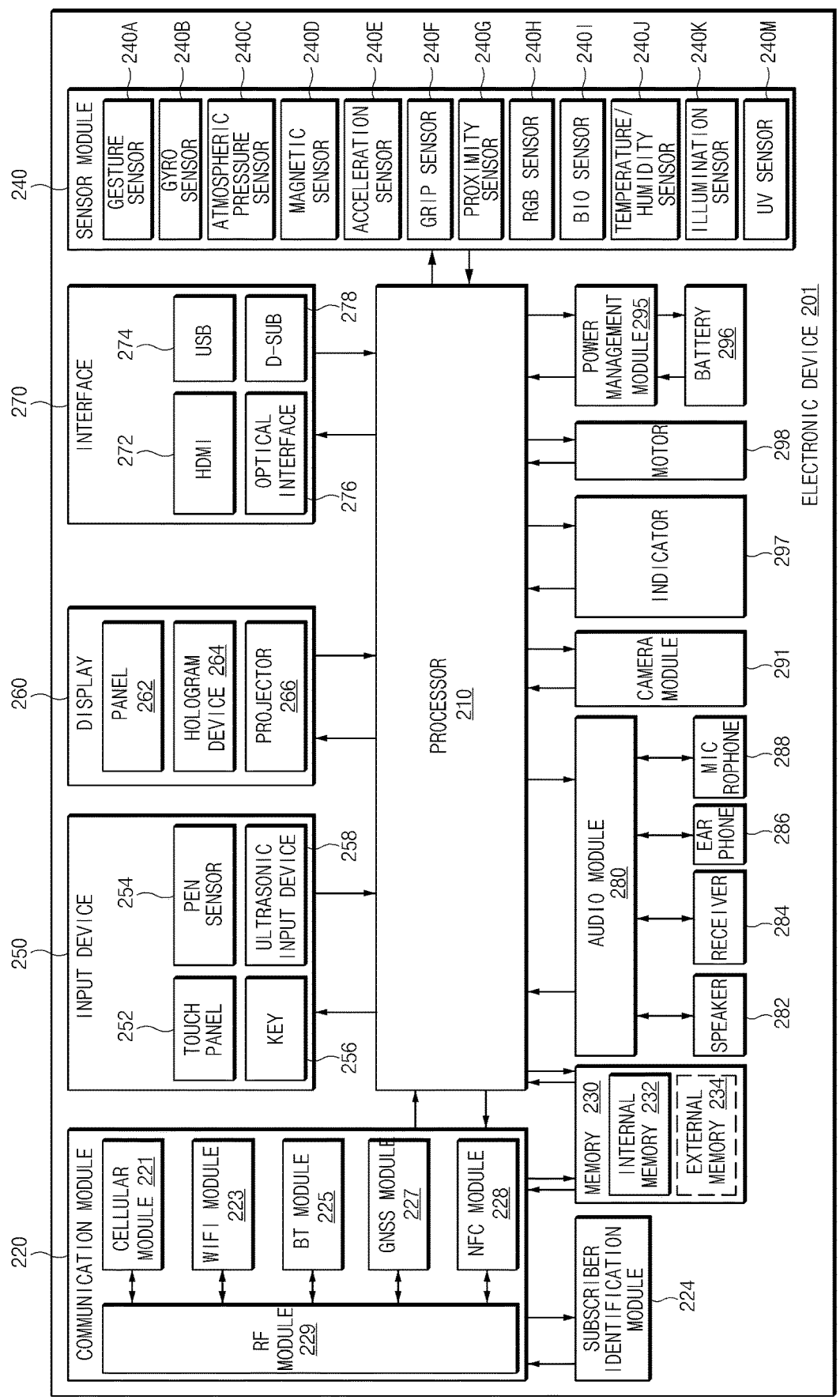
FIG. 2 is a block diagram of an electronic device according to one embodiment.

FIG. 2 illustrates a block diagram of an electronic device, according to one embodiment. An electronic device 201 may include, for example, all or a part of the electronic device 101 illustrated in FIG. 1. The electronic device 201 may include one or more processors (e.g., an application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of elements illustrated in FIG. 2. The processor 210 may load an instruction or data, which is received from at least one of other elements (e.g., a nonvolatile memory), into a volatile memory and process the loaded instruction or data. The processor 210 may store result data in the nonvolatile memory.

The communication module 220 may be configured the same as or similar to the communication interface 170 of FIG. 1. The communication module 220 may include a cellular module 221, a Wi-Fi module 223, a Bluetooth (BT) module 225, a GNSS module 227, a near field communication (NFC) module 228, and a radio frequency (RF) module 229. The cellular module 221 may provide, for example, voice communication, video communication, Internet service, or the like over a communication network. According to an embodiment, the cellular module 221 may perform discrimination and authentication of the electronic device 201 within a communication network by using the subscriber identification module (e.g., a SIM card) 224. According to an embodiment, the cellular module 221 may perform at least a portion of functions that the processor 210 provides. According to an embodiment, the cellular module 221 may include a communication processor (CP). According to an embodiment, at least a part (e.g., two or more) of the cellular module 221, the Wi-Fi module 223, the BT module 225, the GNSS module 227, or the NFC module 228 may be included within one Integrated Circuit (IC) or an IC package. For example, the RF module 229 may transmit and receive communication signals (e.g., RF signals). For example, the RF module 229 may include a transceiver, a power amplifier module (PAM), a frequency filter, a low noise amplifier (LNA), an antenna, or the like. According to another embodiment, at least one of the cellular module 221, the Wi-Fi module 223, the BT module 225, the GNSS module 227, or the NFC module 228 may transmit and receive RF signals through a separate RF module. The subscriber identification module 224 may include, for example, a card and/or an embedded SIM that includes the subscriber identification module and may include unique identify information (e.g., integrated circuit card identifier (ICCID)) or subscriber information (e.g., international mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 234 may include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use capacitive, resistive, infrared and/or ultrasonic detecting methods. Also, the touch panel 252 may further include a control circuit. The touch panel 252 may further include a tactile layer to provide tactile feedback to the user. The (digital) pen sensor 254 may be, for example, a part of a touch panel or may include an additional sheet for recognition. The key 256 may include, for example, a physical button, an optical key, or a keypad. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, a projector 266, and/or a control circuit for controlling the panel 262, the hologram device 264, or the projector 266. The panel 262 may be implemented, for example, to be flexible, transparent or wearable. The panel 262 and the touch panel 252 may be integrated into a single module. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. The hologram device 264 may display a stereoscopic image into space using light interference. The projector 266 may project light onto a screen so as to display an image. For example, the screen may be arranged to be within or outside the electronic device 201. The interface 270 may be, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally, the interface 270 may further include, for example, a mobile high definition link (MHL) interface, a SD card/multi-media card (MMC) interface, or an infrared data association (IrDA) standard interface.

The audio module 280 may convert sounds to electrical signals or vice versa. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288. For example, the camera module 291 may shoot a still image or a video. According to an embodiment, the camera module 291 may include image sensors (e.g., a front sensor or a rear sensor), lenses, one or more image signal processors (ISP), and/or a flash (e.g., an LED or a xenon lamp). The power management module 295 may manage, for example, the power of the electronic device 201. According to an embodiment, a power management integrated circuit (PMIC), a charger IC, or a battery or fuel gauge may be included in the power management module 295. The PMIC may employ wired or wireless charging methods. The wireless charging method may employ, for example, magnetic resonance charging, magnetic induction charging or electromagnetic charging. The PMIC may further include additional circuits such as coil loops, resonant circuits, rectifiers, or the like. The battery gauge may measure, for example, the remaining capacity of the battery 296 and the voltage, current or temperature thereof while the battery is charged. The battery 296 may be, for example, a rechargeable battery and/or a solar battery.

The indicator 297 may display a specific state of the electronic device 201 or a part thereof (e.g., the processor 210), such as states when the electronic device 201 is booting, transmitting/receiving a message, charging, etc. The motor 298 may convert an electrical signal into a mechanical vibration and may generate vibration, haptic feedback, etc. The electronic device 201 may include a processing device (e.g., a GPU) for supporting a mobile TV. The processing device for supporting the mobile TV may process media data according to the standards of digital multimedia broadcasting (DMB), digital video broadcasting (DVB), MediaFLO™, or the like. Each of the above-mentioned elements of the electronic device according to various embodiments of the present disclosure may be configured with one or more components, and the names of the elements may be changed according to the type of the electronic device. In various embodiments, some elements of the electronic device (e.g., the electronic device 201) may be omitted or other additional elements may be added. Furthermore, some of the elements of the electronic device may be combined with each other so as to form one entity, so that the functions of the elements may be performed in the same manner as before the combination.

Figure 3:
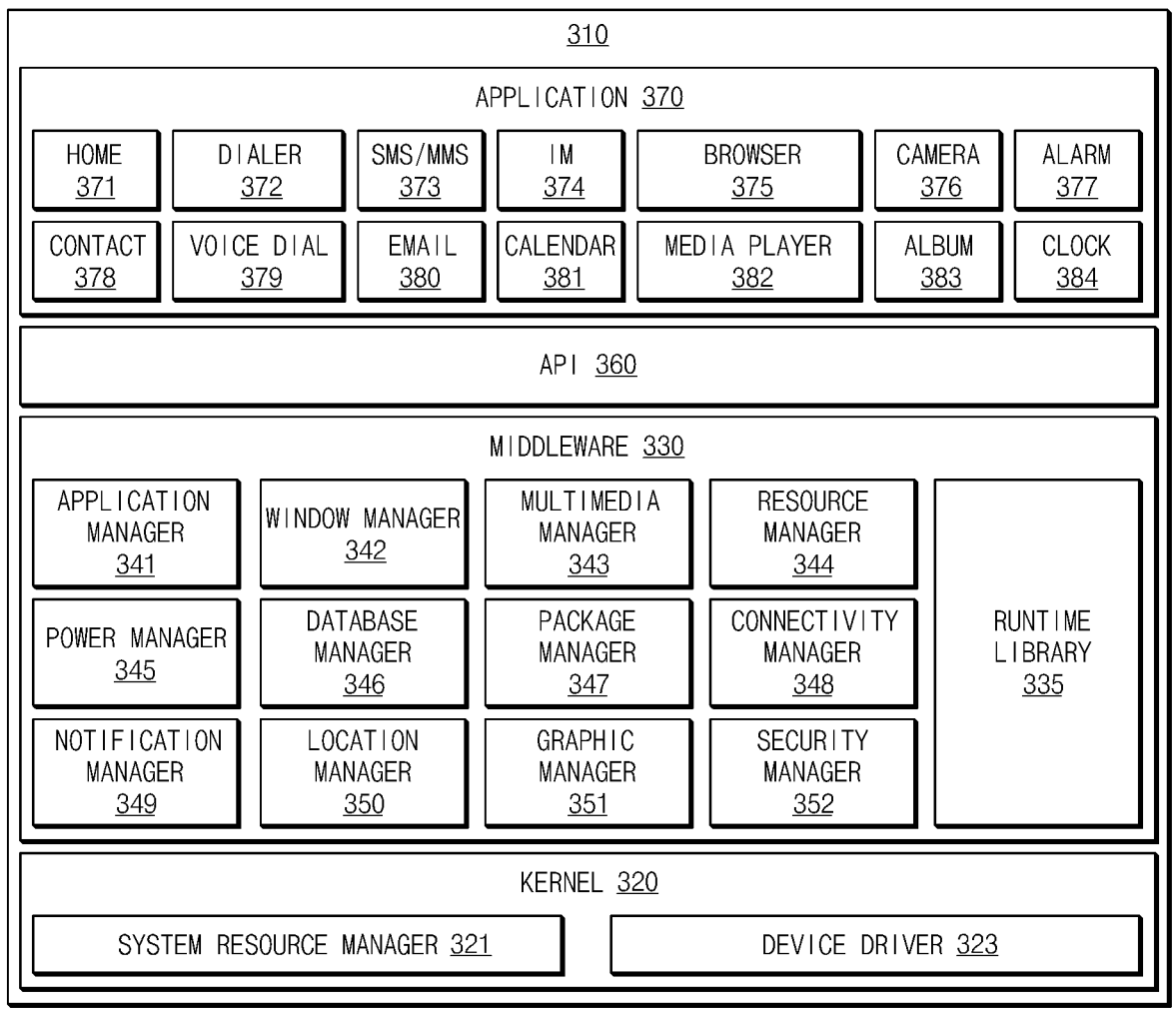
FIG. 3 is a block diagram of a program module according to one embodiment.

FIG. 3 illustrates a block diagram of a program module, according to one embodiment. According to an embodiment, a program module 310 (e.g., the program 140) may include an operating system (OS) to control resources associated with the corresponding electronic device (e.g., the electronic device 101), and/or applications (e.g., the application program 147) executing on top of the OS. The OS may be, for example, Android™, iOS™Windows™, Symbian™, Tizen™, or Bada™. The program module 310 may include a kernel 320 (e.g., the kernel 141), a middleware 330 (e.g., the middleware 143), an application programming interface (API) 360 (e.g., the API 145), and/or an application 370 (e.g., the application program 147). At least a portion of the program module 310 may be preloaded on an electronic device or may be downloadable from an external electronic device (e.g., the first electronic device 102, the second electronic device 104, the server 106, or the like).

The kernel 320 (e.g., the kernel 141) may include, for example, a system resource manager 321 or a device driver 323. The system resource manager 321 may control, allocate, or retrieve system resources. According to an embodiment, the system resource manager 321 may include a process managing unit, a memory managing unit, a file system managing unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, a function that the application 370 needs in common, or may provide various functions to the application 370 through the API 360 to allow the application 370 to efficiently use limited system resources of the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a position manager 350, a graphic manager 351, or a security manager 352.

The runtime library 335 may include, for example, a library module that is used by a compiler to generate new functions while the application 370 is being executed. The runtime library 335 may perform input/output management, memory management, or arithmetic functions. The application manager 341 may manage, for example, life cycles of the application 370. The window manager 342 may manage the graphic user interface (GUI) resource that is used in the display. The multimedia manager 343 may identify formats necessary for playing back various media files, and may perform encoding or decoding of the media files by using codecs suitable for the formats. The resource manager 344 may manage resources such as memory space or source code of the application 370. The power manager 345 may manage power (e.g. battery power), and may provide power information for an operation of an electronic device. According to an embodiment, the power manager 345 may operate with a basic input/output system (BIOS). The database manager 346 may generate, search for, or modify database that is to be used in the application 370. The package manager 347 may install or update the application that is distributed in the package file.

The connectivity manager 348 may manage, for example, wireless connections. The notification manager 349 may provide an event, for example, for a received message, for an appointment, or for a proximity notification to the user. For example, the position manager 350 may manage position information about the electronic device. The graphic manager 351 may manage graphic effects that are provided to the user, or manage the user interface relevant thereto. The security manager 352 may provide, for example, system security or user authentication. According to an embodiment, the middleware 330 may include a telephony manager for managing voice or video call functions. According to an embodiment, the middleware 330 may provide a module specialized for each OS. Additionally, the middleware 330 may dynamically remove a part of existing elements or may add new elements thereto. The API 360 may be, for example, a set of programming functions and may vary depending on the OS. For example, in the case where the OS is Android, it may provide one API set suitable for the Android OS. In the case where the OS is the Tizen OS, it may provide two or more API sets.

The application(s) 370 may include, for example, one or more applications such as the home screen 371, the dialer 372, the SMS/MMS application 373, the instant message (IM) application 374, the browser 375, the camera 376, the alarm 377, the contacts 378, the voice dial 379, the e-mail application 380, the calendar 381, the media player 382, the album application 383, the clock application 384, health care applications (e.g., measuring exercise quantity undertaken by the user, blood sugar, or the like) or environment information applications (e.g., measuring barometric pressure, humidity, temperature, or the like). According to an embodiment, the application 370 may include an information exchanging application to support information exchange between an electronic device and an external electronic device. The information exchanging application may include, for example, a notification relay application for transmitting specific information to an external electronic device, or a device management application for managing the external electronic device. For example, the notification relay application may perform the function of transmitting notification information, which arise from other applications, to an external electronic device or may receive, for example, notification information from an external electronic device and provide the notification information to the user. The device management application may manage (e.g. install, delete, or update), for example, a function (e.g., turn-on/turn-off of a portion or all of the external electronic device itself, adjust the brightness or resolution of the display, etc.) of the external electronic device, an application running in the external electronic device, or a service (e.g., call service, message service, or the like) provided by the external electronic device. According to an embodiment, the application 370 may include an application (e.g., a health care application of a mobile medical device) that is assigned in accordance with an attribute of an external electronic device. According to an embodiment, the application 370 may include an application that is received from an external electronic device. At least a portion of the program module 310 may be implemented by software, firmware, hardware (e.g., the processor 210), or a combination (e.g., execution) of two or more thereof, and may include modules, programs, routines, sets of instructions, processes, or the like for performing one or more functions.

Figure 4A:
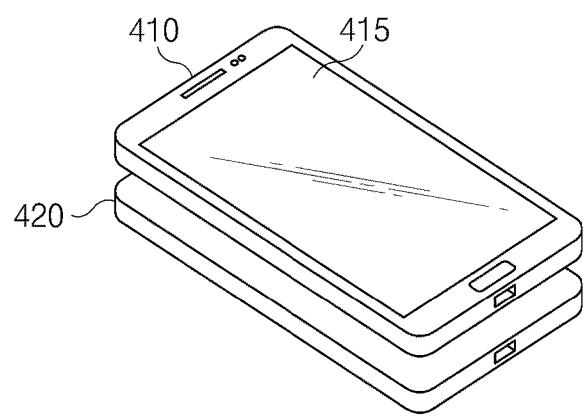
FIG. 4A and FIG. 4B are perspective views illustrating a first electronic device and a second electronic device that perform wireless charging according to one embodiment.
Figure 4B:
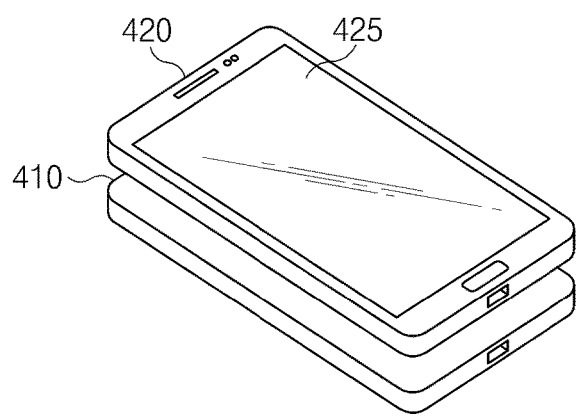

FIGS. 4A and 4B are perspective views illustrating a first electronic device and a second electronic device that perform wireless charging according to one embodiment.

Referring to FIGS. 4A and 4B, a first electronic device 410 may perform wireless charging with a second electronic device 420. Each of the first electronic device 410 and the second electronic device 420 may include a charging coil (not illustrated) for wireless charging. The first electronic device 410 and the second electronic device 420 may be, for example, the electronic device 101 of FIG. 1 or the electronic device 201 of FIG. 2.

According to one embodiment, the charging coil may be positioned on the rear surfaces of each of the first electronic device 410 and the second electronic device 420. The front surfaces of each of the first and second electronic devices 410 and 420 may be where their displays are positioned, and the rear surfaces may be surfaces opposite the front surfaces. To perform the wireless charging, the rear surface of the first electronic device 410 and the rear surface of the second electronic device 420 may be placed to face each other. A display 415 may be disposed on the front surface of the first electronic device 410, and a display 425 may be disposed on the front surface of the second electronic device 420.

Referring to FIG. 4A, assuming that the display 415 of the first electronic device 410 is on top and facing the user, the display 425 of the second electronic device 420 may be positioned in a direction that faces away from the user. Accordingly, in this situation, the contents displays on the display 425 are obscured from the user. For example, the first electronic device 410 and the second electronic device 420 may lie on a table or desk (not shown in FIGS. 4A and 4B) for the wireless charging. When the first electronic device 410 is on top, the display 425 of the second electronic device 420 is obscured by the table.

Referring to FIG. 4B, assuming that the display 425 of the second electronic device 420 is on top, the display 415 of the first electronic device 410 may be positioned in a direction that faces away from the user. Thus, as shown in FIGS. 4A and 4B, the display of whichever electronic device is on top may be visible. However, the display of whichever electronic device is on the bottom may be obscured.

But if the display 415 of the first electronic device 410 and display 425 of the second electronic device 420 face the same direction, the rear surfaces of the first electronic device 410 and the second electronic device 420 do not face each other. It this case, wireless charging may not occur, or the efficiency of the wireless charging may not be good. Accordingly, to ensure proper wireless power transmission, the rear surface of the first electronic device 410 and the rear surface of the second electronic device 420 should be disposed to face each other as illustrated in FIGS. 4A and 4B.

According to one embodiment, the first electronic device 410 may determine the direction that its display is facing through a sensor provided in the first electronic device 410. As such, the first electronic device 410 may be able to determine the spatial relationship between the first electronic device 410 and the second electronic device 420. For example, using a gyro sensor, the first electronic device 410 may determine whether its front surface (i.e. the surface containing the display 415) faces the top side (e.g., a +z direction) or the bottom side opposite to the top side (e.g., a −z direction). The top side may be, for example, a direction facing a sky, and the bottom side may be, for example, a direction facing a ground.

Alternatively, the first electronic device 410 may determine the direction that its front surface is facing by using an image sensor provided on the front surface of the first electronic device 410. For example, the first electronic device 410 may determine that its front surface is facing the top side when its camera captures an image of the user or an image of certain brightness. Other embodiments are also possible, and the ways for the first electronic device 410 to determine the direction that its front surface is facing is not limited to the explicit disclosures above.

According to one embodiment, the wireless charging may be performed when the first electronic device 410 and the second electronic device 420 contact each other. For example, the first electronic device 410 may transmit power to the second electronic device 420, or the second electronic device 420 may transmit power to the first electronic device 410.

The first electronic device 410 and the second electronic device 420 may exchange information associated with the wireless charging. For the charging electronic device, the information associated with the wireless charging may include, for example, the estimated time for completing the charging, the battery level of the electronic device, the temperature of the electronic device, the charging current, time elapsed while charging, etc. For the electronic device supplying power, the information associated with the wireless charging may include the battery level of the electronic device, the amount of power consumed, the temperature of the electronic device, when charging started, when charging will end, etc.

According to one embodiment, the electronic device on top may output at least a portion of the charging-related information of the external electronic device. In other words, the electronic device on top may display information of the electronic device on the bottom. For example, referring to FIG. 4A, the charging-related information of the first electronic device 410 and the charging-related information of the second electronic device 420 may be displayed in the display 415 of the first electronic device 410, when the display 415 is facing the top side. Alternatively, referring to FIG. 4B, the charging-related information of the second electronic device 420 and the charging-related information of the first electronic device 410 may be displayed in the display 425 of the second electronic device 420, when the display 425 is facing the top side.

Accordingly, the user may verify the charging-related information of the first electronic device 410 and the second electronic device 420 easily, even when one of the displays is obscured.

Figure 5:
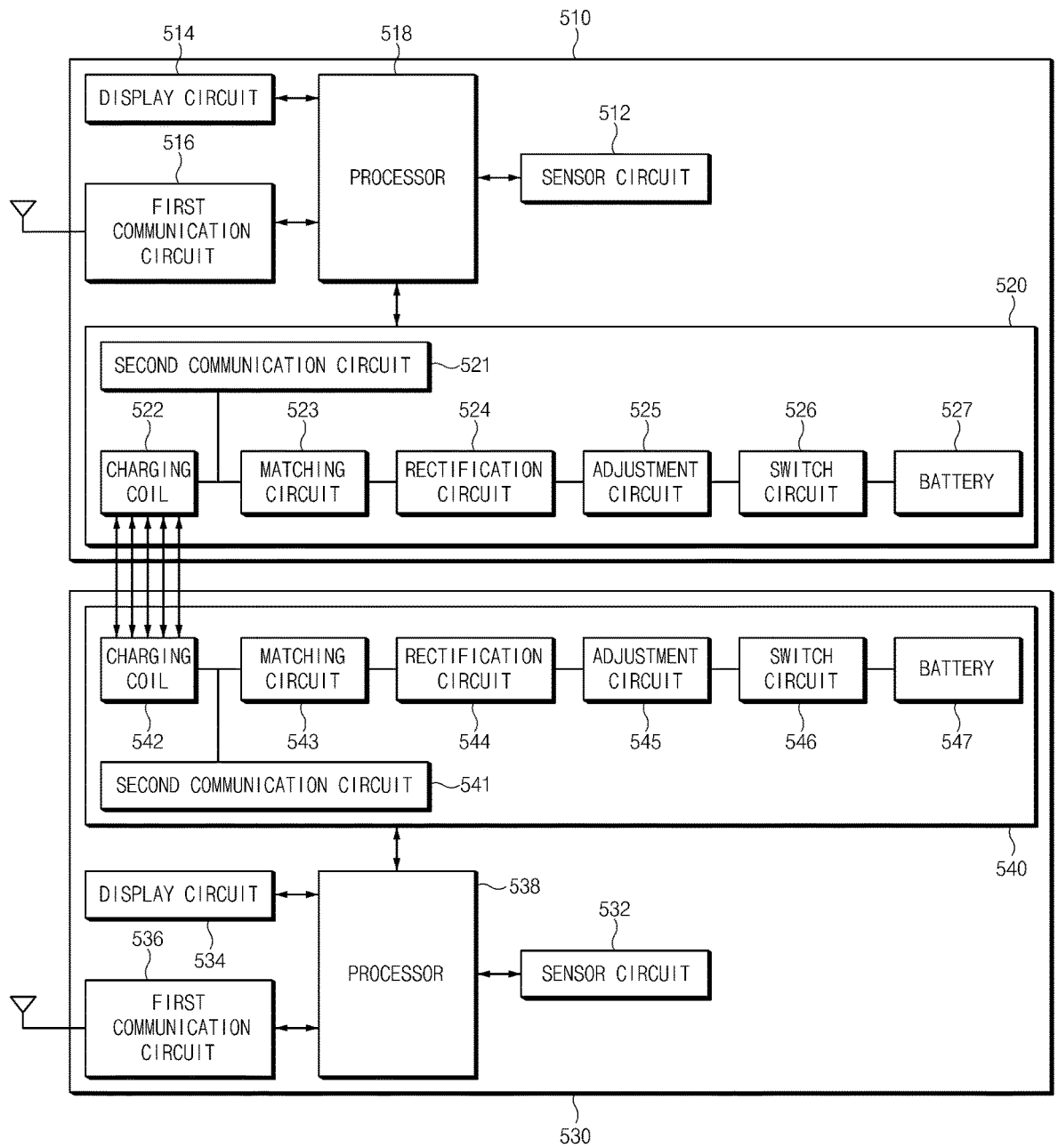
FIG. 5 is a block diagram of a first electronic device and a second electronic device according to one embodiment.

FIG. 5 is a block diagram of a first electronic device and a second electronic device, according to one embodiment. A first electronic device 510 and a second electronic device 530 may have the same configuration.

Referring to FIG. 5, the first electronic device 510 may include a sensor circuit 512, a display circuit 514, a first communication circuit 516, a processor 518, and a charging circuit 520. The configuration of the first electronic device 510 illustrated in FIG. 5 may be only one implementation and may be variously changed or modified. For example, the first electronic device 510 may further include a user interface for receiving any command or information from the user. The user interface may be, in general, an input device such as a keyboard, a mouse, or the like, but the user interface may also be a graphic user interface (GUI) provided through a display of the first electronic device 510.

The sensor circuit 512 may sense a state of the first electronic device 510 and/or a surrounding state of the first electronic device 510 by using various sensors (e.g., the sensor module 240 of FIG. 2) provided in the first electronic device 510.

The display circuit 514 may provide a variety of contents through the display of the first electronic device 510. The contents may include widget screens, application execution screens, text, images, videos, icons, symbols, or the like. The display may be, for example, a liquid crystal display (LCD), a light-emitting diode (LED) display, an organic LED (OLED) display, or the like.

The first communication circuit 516 may communicate with external networks or devices. For example, the first communication circuit 516 may receive a message or an incoming call from an external base station. In an embodiment, the first communication circuit 516 may communicate with a first communication circuit 536 of the second electronic device 530. The first communication circuit 516 and the first communication circuit 536 of the second electronic device 530 may communicate with each other through the base station or may perform short range communication with each other without the base station. The short range communication may be via, for example, Bluetooth (BT) communication, Bluetooth low energy (BLE) communication, near-field communication (NFC), wireless fidelity (Wi-Fi) communication, magnetic secure transmission (MST) communication, infrared (IR) communication, radio frequency (RF) communication, Zigbee communication, or the like.

The processor 518 may be implemented with, for example, a system on chip (SoC) and may include one or more central processing units (CPU), a graphic processing unit (GPU), an image signal processor, an application processor (AP), or a communication processor (CP). The processor 518 may load and process commands or data received from at least one of the other elements (e.g., the sensor circuit 512, the display circuit 514, the first communication circuit 516, and the charging circuit 520) or from a memory (not illustrated) and may store various data in the memory.

The processor 518 may determine whether the second electronic device 530 is nearby, through the sensor circuit 512. For example, the processor 518 may determine whether the charging coil 522 of the first electronic device 510 and the charging coil 542 of the second electronic device 530 are positioned to correspond to each other, i.e. face each other.

The processor 518 may determine whether the second electronic device 530 is nearby using in-band communication or out-band communication.

The in-band communication is communication where the first electronic device 510 and the second electronic device 530 exchange control messages within the frequency range used for wireless power transmission. The second communication circuit 521 may be used for in-band communication. The second communication circuit 521 may detect that the two coils 522 and 542 are adjacent to each other when it detects a change in current induced in the coil 522. The second communication circuit 521 may then perform ping-identification and configuration-power transfer operations. In addition, the electronic device that receives power may further include a switch that controls the reception of the power. Accordingly, the electronic device that transmits power may detect whether the switch is on or off, by detecting the amount of power that is consumed in the electronic device transmitting power.

The out-band communication is communication where the electronic device supplying power and the electronic device receiving the power exchange a control message and the like by using a frequency in a range separate from the frequency range used for wireless power transmission. The out-band communication may employ a short range communication protocol (e.g., BT, Wi-Fi, NFC, or the like).

The processor 518 may provide a user interface (UI) querying the user whether to perform the wireless charging through the display circuit 514. In the case where a user input requesting execution of the wireless charging is received from the user, the processor 518 may perform the wireless charging with the charging circuit 540 of the second electronic device 530 through the charging circuit 520 of the first electronic device 510. Alternatively, the user input requesting execution of the wireless charging may be inputted through a physical button provided in the first electronic device 510.

The charging circuit 520 of the first electronic device 510 may include the second communication circuit 521, the charging coil 522, a matching circuit 523, a rectification circuit 524, an adjustment circuit 525, a switch circuit 526, and a battery 527. The charging circuit 540 of the second electronic device 530 may perform operations corresponding to the charging circuit 520 of the first electronic device 510.

The first electronic device 510 may correspond to the first electronic device 410 illustrated in FIG. 4, and the second electronic device 530 may correspond to the second electronic device 420 of FIG. 4. For example, the first electronic device 510 may be placed on the second electronic device 530 such that a rear surface of the first electronic device 510 and a rear surface of the second electronic device 530 face each other.

As described above, if the rear surface of the first electronic device 510 and the rear surface of the second electronic device 530 face each other, the charging circuit 520 of the first electronic device 510 and the charging circuit 540 of the second electronic device 530 may perform charging. For example, the charging may be performed using magnetic induction.

Using magnetic induction, a magnetic field in the charging coil 522 of the first electronic device 510 is generated, and the magnetic field induces an electromagnetic field in the charging coil 542 of the second electronic device 530. The induced electromagnetic field can then be used to charge the second electronic device 530.

The first electronic device 510 may include a user input circuit. The user input circuit may process a user input that is inputted from the user. The user input may be a touch input using user's finger or a stylus (e.g., an electronic pen). Also, the user input may include a hover input, for example, when the first electronic device 510 detects the user's finger or the stylus even when the user's finger or the stylus does not directly contact the first electronic device 510. The user input circuit may be a touch integrated circuit (IC).

In addition, the user input circuit may distinguish and process various kinds of touch inputs, including touch taps, touch drags, touch releases, touch holds (i.e. long presses), drag and drop, etc.

Figure 6:
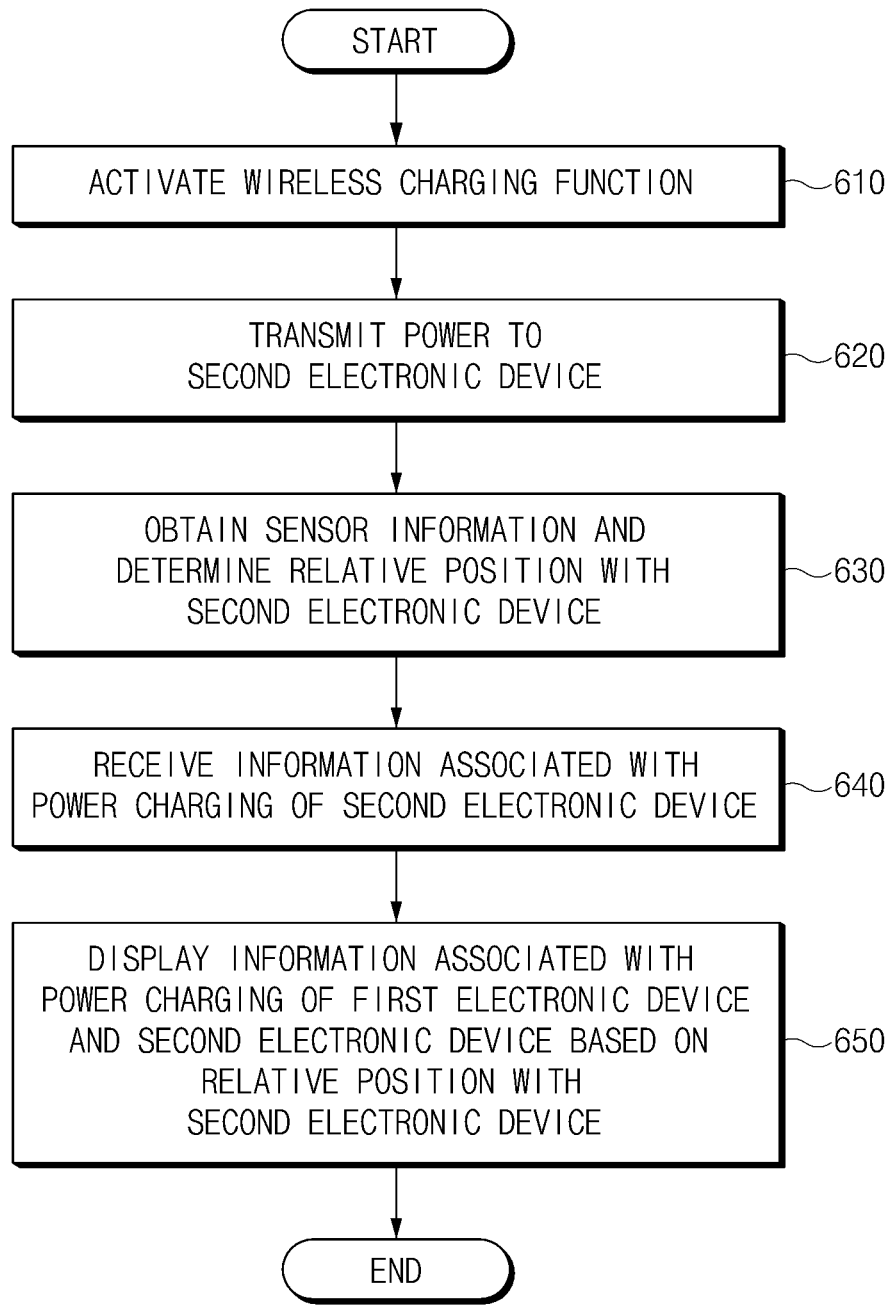
FIG. 6 is a flowchart illustrating a method for displaying information associated with wireless charging when a first electronic device according to one embodiment transmits power via wireless charging.

FIG. 6 is a flowchart illustrating a method for displaying information associated with wireless charging when a first electronic device according to one embodiment transmits power via wireless charging.

Referring to operation 610, the first electronic device 510 may activate the wireless charging function. For example, the user may manipulate an UI provided through the display of the first electronic device or a physical button to activate the wireless charging function. If the wireless charging function of the first electronic device 510 is activated and the first electronic device 510 and the second electronic device 530 are close to each other, the first electronic device 510 may supply power to the second electronic device 530.

According to another embodiment, the first electronic device 510 may search for the second electronic device 530 using short range communication such as NFC or BT. When the second electronic device 530 is detected, the first electronic device 510 may activate wireless charging if the user explicitly permits activation of the wireless charging function or when the battery level of the first electronic device 510 is more than a specific reference level. The first electronic device 510 may activate the wireless charging function by receiving information about the battery remaining capacity of the second electronic device 530 through communication with the second electronic device 530 and comparing the battery remaining capacity of the second electronic device 530 and the battery remaining capacity of the first electronic device 510.

When the wireless charging function is activated in the first electronic device 510, to improve the efficiency of wireless charging, some functions of the first electronic device 510 may be restricted. For example, the first electronic device 510 may stop or change the operations of some of the currently executing applications, decrease the maximum clock of the processor 518, etc.

Also, during wireless charging, the first electronic device 510 may enter a low-power mode. For example, in the low-power mode, parts of the processor 518 may be deactivated such that the processor 518 is restricted to only operate the user input circuit to detect user inputs, without determining the location of the user input.

Referring to operation 620, the first electronic device 510 may transmit power to the second electronic device 530 via wireless charging. For example, the first electronic device 510 may transmit power using magnetic induction.

Referring to operation 630, the first electronic device 510 may obtain sensor information and may determine its relative position with the second electronic device 530. For example, the first electronic device 510 may determine whether its front surface is facing the top side or the bottom side, by using a gyro sensor.

According to another embodiment, the first electronic device 510 may determine whether its front surface is facing the top side or the bottom side by using an image sensor provided on the front surface of the first electronic device 510. For example, the first electronic device 510 may determine that its front surface is facing the top side when its camera captures an image of the user or an image of certain brightness.

Also, the first electronic device 510 may determine whether the charging coil of the first electronic device 510 and the charging coil of the second electronic device 530 are aligned with each other. Through the above-described process, the first electronic device 510 may determine whether the first electronic device 510 is placed on the second electronic device 530 or under the second electronic device 530.

Referring to operation 640, if the first electronic device 510 is facing the top side, it may receive information associated with power charging of the second electronic device 530.

According to one embodiment, the information associated with the power charging may be transmitted through the first communication circuit 516 of the first electronic device 510 and the first communication circuit 536 of the second electronic device 530. In another embodiment, the information associated with the power charging may be transmitted in the frequency band used for wireless charging between the first electronic device 510 and the second electronic device 530. In this case, the information associated with the power charging may be transmitted through the second communication circuit 521 of the first electronic device 510 and the second communication circuit 541 of the second electronic device 530.

The information associated with the power charging may vary depending on whether the electronic device transmitting the information is supplying power or is receiving power. For example, in the case where the first electronic device 510 supplies power, the first electronic device 510 may transmit, to the second electronic device 530, information about its battery level, the power consumed during the wireless charging, its temperature, the battery level when wireless charging started, the battery level when wireless charging ends, etc. But when the first electronic device 510 is receiving power, it may receive, from the second electronic device 530, the estimated time for completing the charging, the battery level of the second electronic device 530, the temperature of the second electronic device 530, the charging current, time elapsed while charging, etc.

Referring to operation 650, if the first electronic device 510 is facing the top side, it may display information associated with power charging of the first electronic device 510 and the second electronic device 530. The first electronic device 510 may display the information associated with the power charging of the first electronic device 510 together with information associated with power charging of the second electronic device 530. Accordingly, the user does not need to flip the electronic devices 510 and 530 to verify the states of charge for the devices.

Alternatively, the front surface of the first electronic device 510 may face the bottom side, and the second electronic device 530 may be placed on the first electronic device 510. In this case, since the display of the first electronic device 510 faces the bottom side, the first electronic device 510 may not display the information associated with the power charging in the display. Instead, the display of the second electronic device 530 may display the information associated with the power charging.

Figure 7:
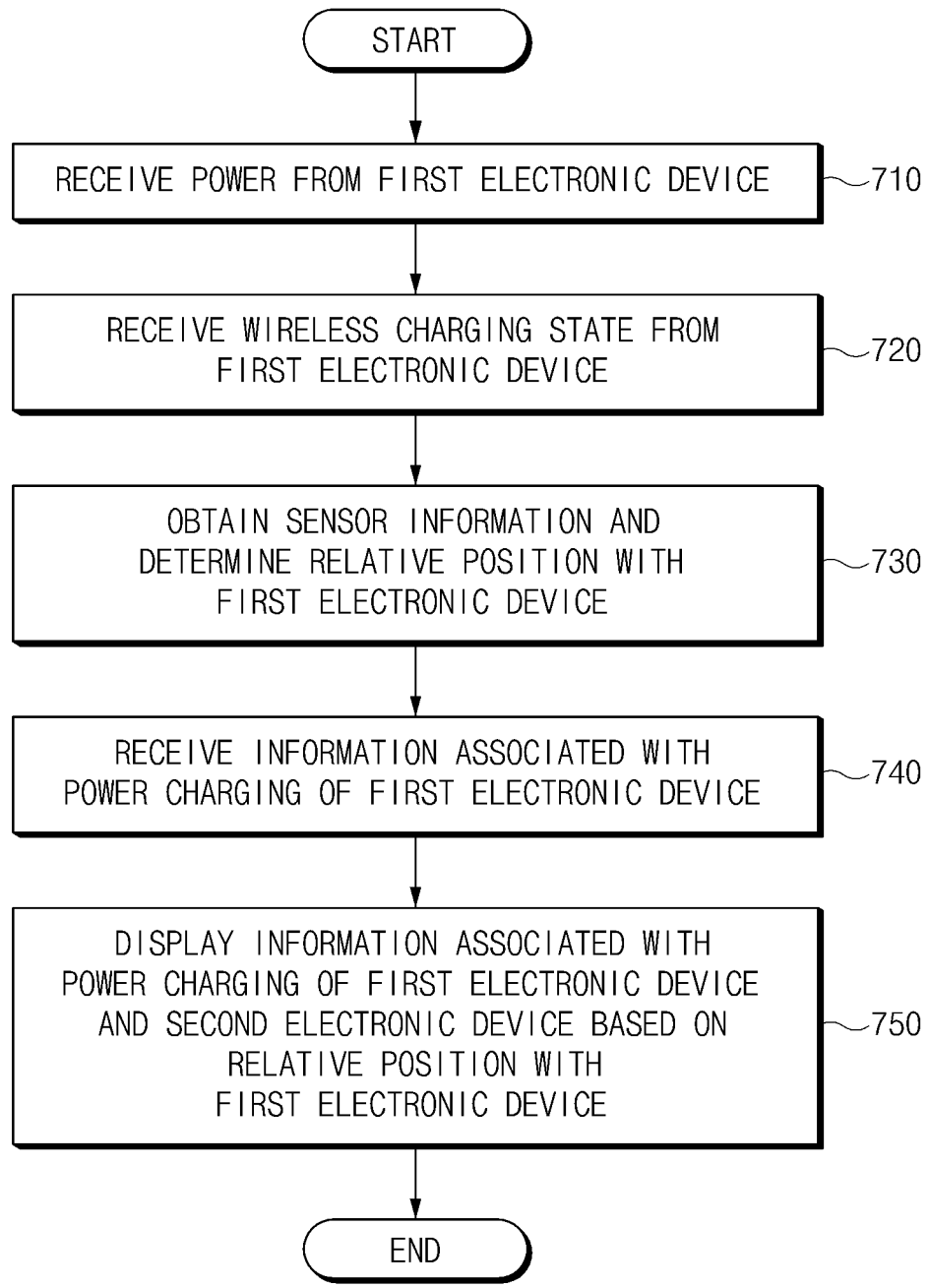
FIG. 7 is a flowchart illustrating a method for displaying information associated with wireless charging when a second electronic device according to one embodiment receives power via wireless charging.

FIG. 7 is a flowchart illustrating a method for displaying information associated with wireless charging when a second electronic device according to one embodiment receives power via wireless charging.

Referring to operation 710, the second electronic device 530 may receive power from the first electronic device 510. According to one embodiment, for the electronic device receiving power, the wireless charging circuits may be activated automatically. Accordingly, if the first electronic device 510 activates a wireless charging function and the first electronic device 510 and the second electronic device 530 are close to each other, the second electronic device 530 may be supplied with power from the first electronic device 510. The user does not manipulate the second electronic device 530 in order to initiate wireless charging in the second electronic device 530. The first electronic device 510 and the second electronic device 530 may transmit and receive power by using the above-described wireless charging method of magnetic induction.

Referring to operation 720, the second electronic device 530 may receive information about the wireless charging state from the first electronic device 510. The first electronic device 510 may transmit, to the second electronic device 530, information indicating that the second electronic device 530 is being currently supplied with power from an electronic device capable of wireless communication. Accordingly, the first electronic device 510 and the second electronic device 530 may mutually exchange information associated with the wireless charging.

According to various embodiments, the first electronic device 510 and the second electronic device 530 may mutually exchange information associated with the wireless charging through in-band communication or out-band communication.

In-band communication uses the same frequency as the frequency that the first electronic device 510 and the second electronic device 530 use for wireless power transmission. The out-band communication uses a separate frequency from the frequency that the first electronic device 510 and the second electronic device 530 use for power transmission. The out-band communication manner may correspond to a short range communication protocol (e.g., BT, Wi-Fi, NFC, or the like).

Referring to operation 730, the second electronic device 530 may obtain sensor information and may determine its relative position with the first electronic device 510. For example, the second electronic device 530 may determine whether its front surface is facing the top side or the bottom side, by using a gyro sensor.

According to another embodiment, the second electronic device 530 may determine whether its front surface is facing the top side or the bottom side by using an image sensor provided on the front surface of the second electronic device 530. For example, the second electronic device 530 may determine that its front surface is facing the top side when its camera captures an image of the user or an image of certain brightness.

Referring to operation 740, if the second electronic device 530 is facing the top side, it may receive information associated with power charging of the first electronic device 510.

According to one embodiment, the information associated with the power charging may be transmitted through the first communication circuit 536 of the second electronic device 530 and the first communication circuit 516 of the first electronic device 510. In another embodiment, the information associated with the power charging may be transmitted in the frequency band used for wireless charging between the second electronic device 530 and the first electronic device 510. In this case, the information associated with the power charging may be transmitted through the second communication circuit 541 of the second electronic device 530 and the second communication circuit 521 of the first electronic device 510.

Referring to operation 750, if the second electronic device 530 is facing the top side, it may display information associated with power charging of the second electronic device 530 and the first electronic device 510. The second electronic device 530 may display the information associated with the power charging of the first electronic device 510 together with information associated with power charging of the second electronic device 530. Accordingly, the user does not need to flip the electronic devices 510 and 530 to verify the states of charge for the devices.

Alternatively, the front surface of the second electronic device 530 may face the bottom side, and the first electronic device 510 may be placed on the second electronic device 530. In this case, since the display of the second electronic device 530 faces the bottom side, the second electronic device 530 may not display the information associated with the power charging in the display. Instead, the display of the first electronic device 510 may display the information associated with the power charging.

According to one embodiment, the electronic device supplying power may restrict some of its functions based on a target charging factor of the electronic device receiving the power. The target charging factor may include, for example, a target charging time or a target charging level. That is, it may be possible to restrict some functions of the electronic device supplying the power for the purposes of charging the electronic device receiving the power to a certain target.

For example, when the first electronic device 510 supplies power to the second electronic device 530, the first electronic device 510 may restrict some of its functions based on a charging target for the second electronic device 530. Restricting the functions of the first electronic device 510 may include, for example, preventing low-priority applications from executing, decreasing illuminance of the display, restricting notifications, etc.

According to one embodiment, when an electronic device receiving power is placed on an electronic device supplying the power, the electronic device receiving the power may display some of the notifications generated in the electronic device supplying the power. Accordingly, the electronic device supplying the power is not required to display the notifications and power consumption by the electronic device supplying the power may be reduced.

For example, when the second electronic device 530 is placed on the first electronic device 510, and when the first electronic device 510 receives a call, the first electronic device 510 may transfer the call reception or the notification related to the call to the second electronic device 530 by using wireless communication. Accordingly, the user may use the wireless charging function efficiently without missing an important call or notification.

FIGS. 8A to 8C are views illustrating various user interfaces when a first electronic device according to one embodiment activates wireless charging.

Referring to FIG. 8A, if wireless charging is activated, the first electronic device 510 may display an image 820 to guide the wireless charging in the display 810. The user may manipulate an UI provided through the display of the first electronic device 510 or a physical button to activate the wireless charging.

According to one embodiment, the image 820 to guide the wireless charging may show the arrangement of two electronic devices for wireless charging. Referring to FIG. 8A, the guide image 820 may show the two electronic devices where their displays are facing opposite directions If the user selects "PROCEED" 830, the first electronic device 510 may display a screen as illustrated in FIG. 8B.

Referring to FIG. 8B, the first electronic device 510 may display a first user interface 840 to show a current battery capacity of the first electronic device 510 and allow the user to set a battery capacity remaining after transmitting power to the external electronic device. For example, the first user interface 840 may display the current capacity 842, a target capacity 844 remaining after transmitting power to the external electronic device, progress indicator 846, the estimated time remaining for charging 848, etc.

The current capacity 842 may represent the current remaining capacity of the battery of the first electronic device 510. The target capacity 844 may represent the power capacity remaining in the first electronic device 510 after the first electronic device 510 supplies power to the second electronic device 530. The progress indicator 846 may represent the percentage of the charging that has already occurred. The first electronic device 510 may calculate and display the estimated time remaining 848 based on the current battery capacity 842 and the target battery capacity 844.

Referring to FIG. 8C, the user may adjust the target capacity 844. For example, the user may drag the target capacity 844 in the first direction 851 or the second direction 852 by inputting a drag gesture on the display 810. If the target capacity 844 is dragged in the first direction 851, the first electronic device 510 may decrease the amount of power to be transmitted to the second electronic device 530. But if the target capacity 844 is dragged in the second direction 852, the first electronic device 510 may increase the amount of power to be transmitted to the second electronic device 530.

In the embodiment described above, when the user selects "start" 860, the first electronic device 510 may start wireless charging.

Figure 9A:
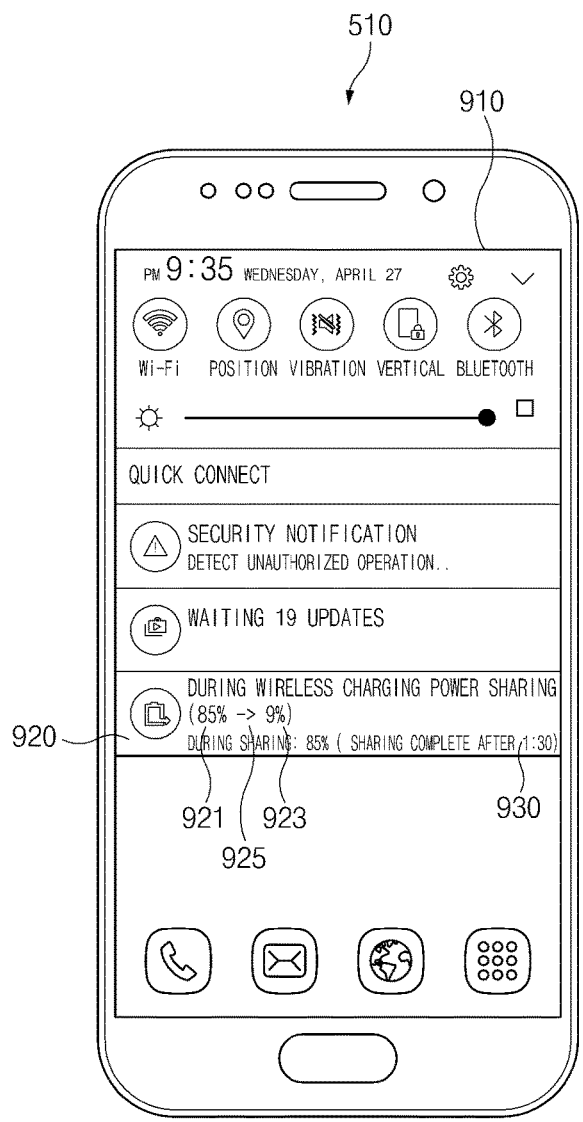
FIG. 9A and FIG. 9B are views illustrating various user interfaces showing wireless charging progress in a notification window when a first electronic device according to one embodiment performs wireless charging to a second electronic device.
Figure 9B:
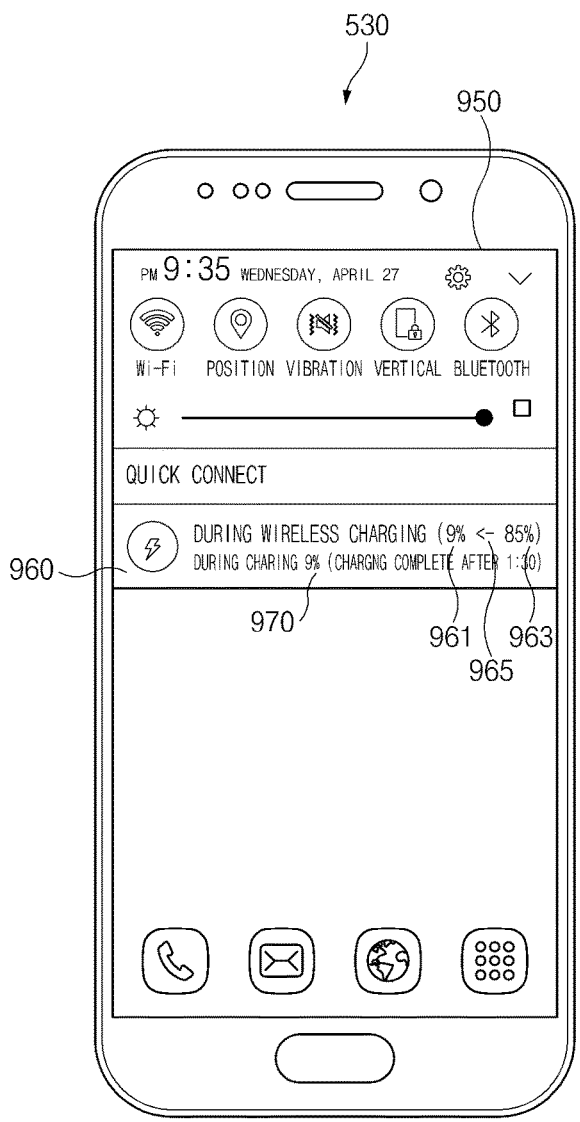

FIGS. 9A and 9B are views illustrating various user interfaces showing wireless charging progress in a notification window when a first electronic device according to one embodiment performs wireless charging to a second electronic device. A notification window may mean, for example, a window displaying various notification content produced in an electronic device. The notification window may be displayed when the user touches and drags from the upper edge of the display 910/950.

FIG. 9A shows a user interface where wireless charging progress is displayed in a notification window of the first electronic device 510 when the first electronic device 510 transmits power to the second electronic device 530. A first notification window 920 may display the current capacity 921 of a battery of the first electronic device 510 and the current capacity 923 of the battery of the second electronic device 530.

The first notification window 920 may display an icon 925 between the current capacity 921 of the first electronic device 510 and the current capacity 923 of the second electronic device 530 to represent the direction in which wireless charging currently is progressing.

Also, the first notification window 920 may display an estimated time 930 when wireless charging may be completed. However, content that the first notification window 920 displays is not limited to those shown in FIG. 9A. For example, the first notification window 920 may display the current progress of the charging. Content displayed in the first notification window 920 may be changed by the user.

FIG. 9B shows a user interface where wireless charging progress is displayed in a notification window of the second electronic device 530 when the second electronic device 530 receives power from the first electronic device 510. A second notification window 960 may display the current capacity 961 of the battery of the second electronic device 530 and the current capacity 963 of the battery of the first electronic device 510.

The second notification window 960 may display an icon 965 between the current capacity 961 of the second electronic device 530 and the current capacity 963 of the first electronic device 510 to represent the direction in which wireless charging currently progresses.

Also, the second notification window 960 may display an estimated time 970 when wireless charging may be completed. However, content that the second notification window 960 displays is not limited to those shown in FIG. 9A. For example, the second notification window 960 may display the current progress of the charging. Like the first notification window 920, content displayed in the second notification window 960 may be changed by the user.

According to one embodiment, if a user input selecting the second notification window 960 is received while the above-described second notification window 960 is displayed, the second electronic device 530 may display another user interface, which is described below. This assumes that the front surface of the second electronic device 530 is facing the top side.

Figure 10A:
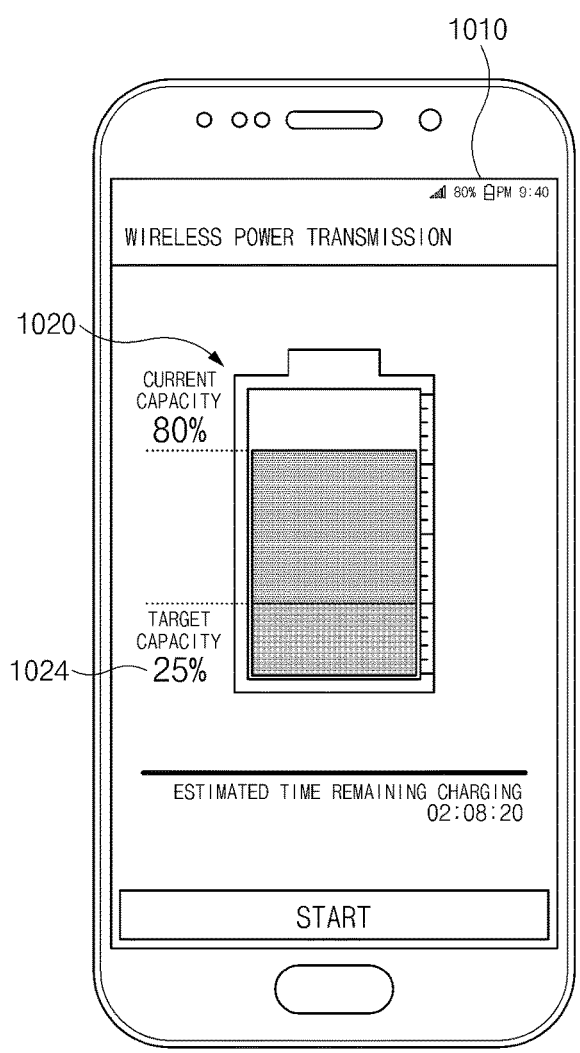
FIG. 10A and FIG. 10B are views illustrating various user interfaces after receiving a user input selecting a second notification window in a second electronic device according to one embodiment.
Figure 10B:
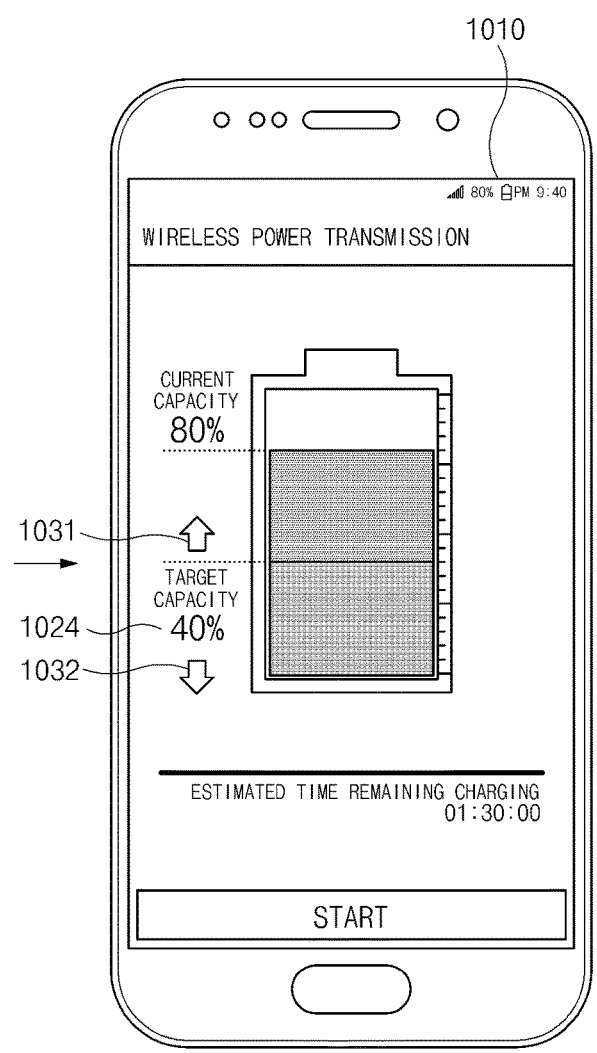

FIGS. 10A and 10B are views illustrating various user interfaces after receiving a user input selecting a second notification window at a second electronic device according to one embodiment.

Referring to FIG. 10A, the second electronic device 530 may display a second user interface 1020 to show the current battery capacity of the first electronic device 510 and the battery capacity remaining after transmitting power to the second electronic device 530.

According to one embodiment, the second user interface 1020 may include the same configuration as the first user interface 840 described in FIG. 8B. However, the first user interface 840 may be displayed in the display 810 of the first electronic device 510 before wireless charging is initiated, and the second user interface 1020 may be displayed in the display 1010 of the second electronic device 530 after the wireless charging is initiated. Accordingly, after the initiation of the wireless charging, the second electronic device 530 receiving the power may control the first electronic device 510 supplying the power.

Referring to FIG. 10B, the user may adjust the target capacity 1024 using the second user interface 1020. For example, the user may drag the target capacity 1024 in the first direction 1031 or the second direction 1032 by inputting a drag gesture on the display 1010. If the target capacity 1024 is dragged in the first direction 1031, the first electronic device 510 may decrease the amount of power to be transmitted to the second electronic device 530. But if the target capacity 1024 is dragged in the second direction 1032, the first electronic device 510 may increase the amount of power to be transmitted to the second electronic device 530. In response to the drag input, the first electronic device 510 may store a setting related to a time interval when charging is allowed. Accordingly, the first electronic device 510 may stop the wireless charging after elapse of that time interval.

Figure 11A:
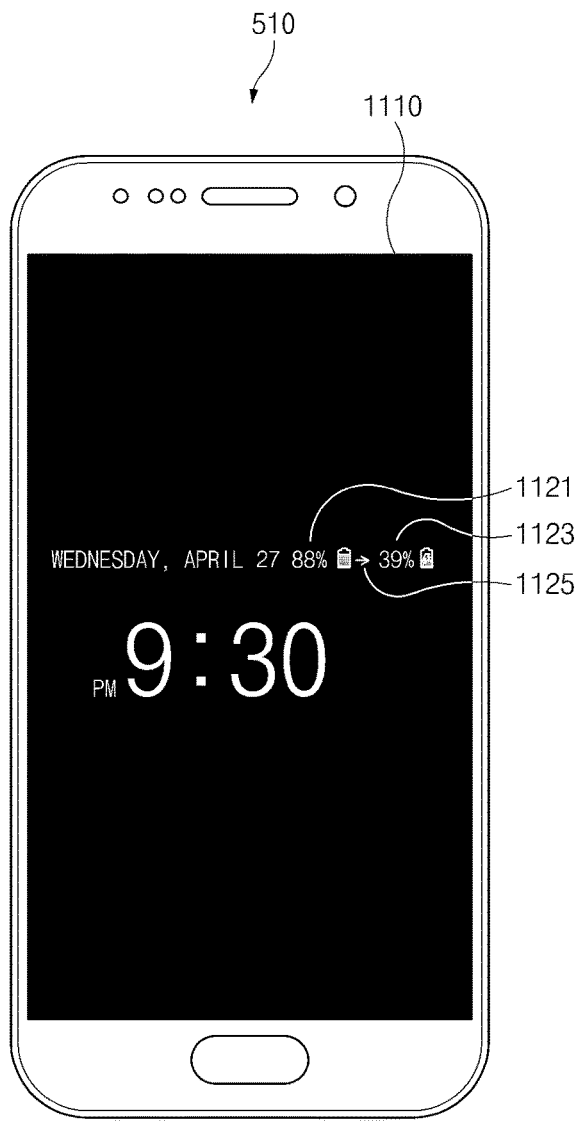
FIG. 11A and FIG. 11B are views illustrating user interfaces for displaying wireless charging progress in an always on display (AOD), such as when a first electronic device and a second electronic device according to one embodiment are powered off or have entered a low-power mode.
Figure 11B:

FIGS. 11A and 11B are views illustrating user interfaces for displaying wireless charging progress in an always on display (AOD), such as when a first electronic device and a second electronic device according to one embodiment are powered off or have entered a low-power mode. Using the AOD function, a display may display content in at least a partial area of the display even when the electronic device operates in the low power mode.

FIG. 11A shows a user interface in which the wireless charging progress is displayed on the display 1110 of the first electronic device 510, when the first electronic device 510 transmits power to the second electronic device 530. According to one embodiment, the first electronic device 510 may display the current capacity 1121 of the battery of the first electronic device 510 and the current capacity 1123 of the battery of the second electronic device 530 in an AOD display.

The first electronic device 510 may display an icon 1125 between the current capacity 1121 of the first electronic device 510 and the current capacity 1123 of the second electronic device 530 to represent the direction in which wireless charging currently progresses. Content that the first electronic device 510 displays is not limited to those shown in FIG. 11A. For example, the first electronic device 510 may display the current progress of the charging. Content that the first electronic device 510 displays in the AOD display 1110 may be changed by the user.

FIG. 11B is a user interface in which the wireless charging progress is displayed in the display 1150 of the second electronic device 530, when the second electronic device 530 receives power from the first electronic device 510. According to one embodiment, the second electronic device 530 may display the current capacity 1161 of the battery of the second electronic device 530 and the current capacity 1163 of the battery of the first electronic device 510 in a state where power is off.

The second electronic device 530 may display an icon 1165 between the current capacity 1161 of the second electronic device 530 and the current capacity 1163 of the first electronic device 510 to represent the direction in which wireless charging currently progresses. Content that the second electronic device 530 displays in the AOD display 1150 may be changed by the user.

Figures 12A, 12B:
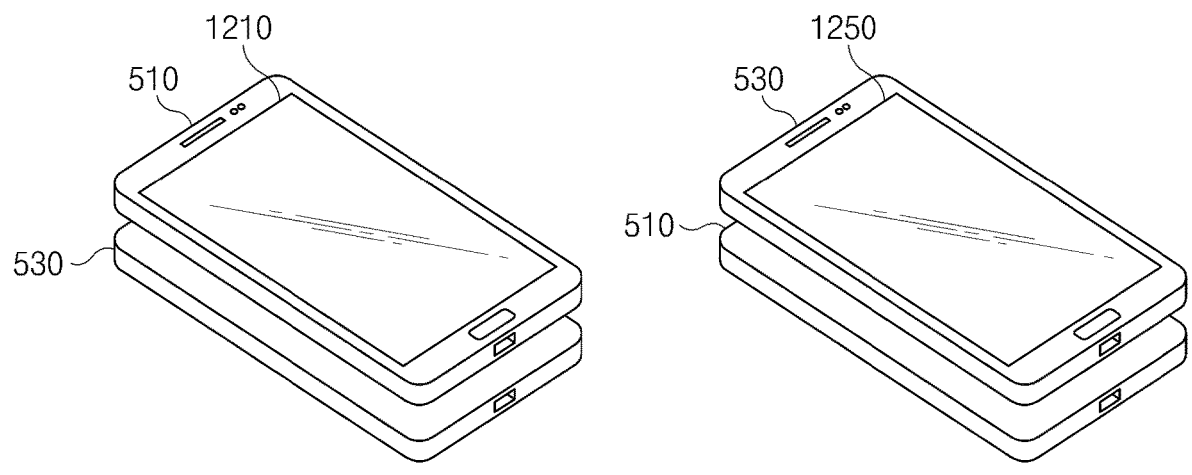
FIG. 12A and FIG. 12B are perspective views illustrating positional changes of a first electronic device and a second electronic device according to an embodiment.

FIGS. 12A and 12B are perspective views illustrating positional changes of a first electronic device and a second electronic device according to one embodiment.

Referring to FIG. 12A, the first electronic device 510 and the second electronic device 530 may transmit and receive power for wireless charging when the first electronic device 510 and the second electronic device 530 are disposed close to each other and face opposite directions. Since the display 1210 of the first electronic device 510 faces the top side, the first electronic device 510 may display information associated with wireless charging between the first electronic device 510 and the second electronic device 530. And since the display 1250 of the second electronic device 530 faces the bottom side, the second electronic device 530 may not display information in the display 1250 or may turn off the display 1250.

According to one embodiment, each of the first electronic device 510 and the second electronic device 530 may periodically monitor changes in their positions. Accordingly, whether the first electronic device 510 or the second electronic device 530 displays charging information depends on whether their positions change.

Referring to FIG. 12B, the first electronic device 510 and the second electronic device 530 may be flipped such that the display 1250 of the second electronic device 530 may face the top side, and the display 1210 of the first electronic device 510 may face the bottom side. The first electronic device 510 and the second electronic device 530 may periodically detect any position change. When the position change occurs, the display 1250 of the second electronic device 530 may display information regarding the wireless charging.

As such, the first electronic device 510 and the second electronic device 530 may periodically verify their positional relationship, and the electronic device having the display that is viewable by the user may display the information associated with the wireless charging.

Figure 13:
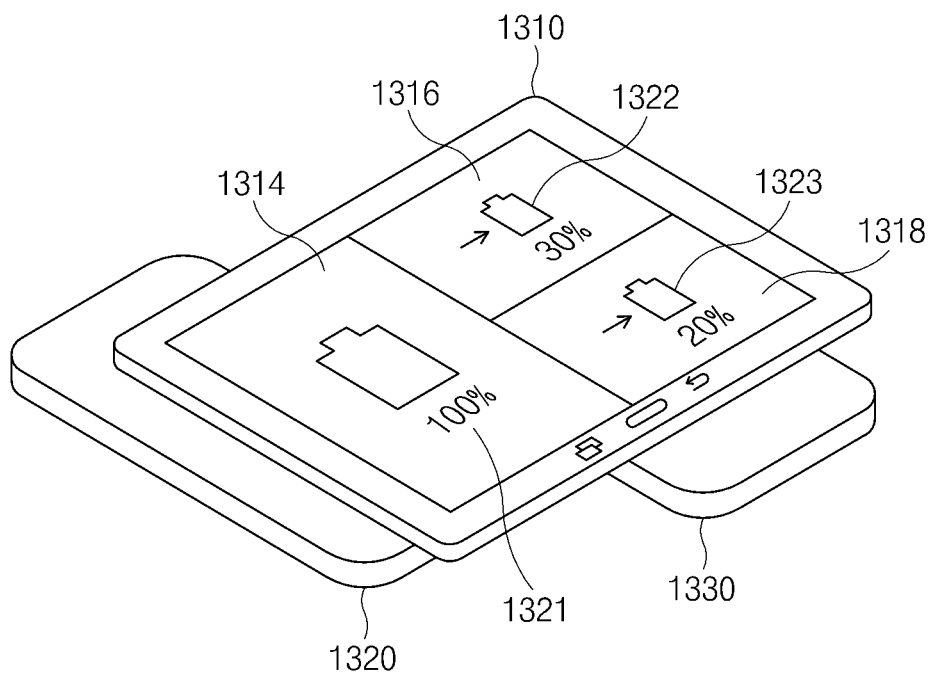
FIG. 13 is a perspective view illustrating a first electronic device, a second electronic device, and a third electronic device performing wireless charging, according to one embodiment.

FIG. 13 is a perspective view illustrating a first electronic device, a second electronic device, and a third electronic device performing wireless charging, according to one embodiment.

Referring to FIG. 13, the first electronic device 1310 may be positioned such that the rear surface of the first electronic device 1310 faces the rear surface of the second electronic device 1320. The description will be given for FIG. 13 under the assumption that wireless charging is performed between the first electronic device 1310 and the second and third electronic devices 1320 and 1330.

Unlike other embodiments, the first electronic device 1310 may include two charging coils. In this case, the first electronic device 1310 may receive or transmit power through the two charging coils. In addition, the first electronic device 1310 may receive power through one charging coil of the two charging coils and may transmit power through the other charging coil. Therefore, the first electronic device 1310 may include a plurality of at least some of the components of the charging circuit 520 shown in FIG. 5.

The first electronic device 1310 may display a user interface showing the wireless charging progress with the second electronic device 1320 and the third electronic device 1330. According to one embodiment, the first electronic device 1310 may distinguish a first display area 1314 to display information associated with wireless charging of the first electronic device 1310, a second display area 1316 to display information associated with wireless charging of the second electronic device 1320, and a third display area 1318 to display information associated with wireless charging of the third electronic device 1330.

For example, the first display area 1314 may display a current battery remaining capacity 1321 of the first electronic device 1310. The second display area 1316 may display a current battery remaining capacity 1322 of the second electronic device 1320, and the third display area 1318 may display a current battery remaining capacity 1323 of the third electronic device 1330.

The types of information that each of the display areas 1314, 1316, and 1318 may display is not limited to those shown in FIG. 13.

Figures 14A, 14B:
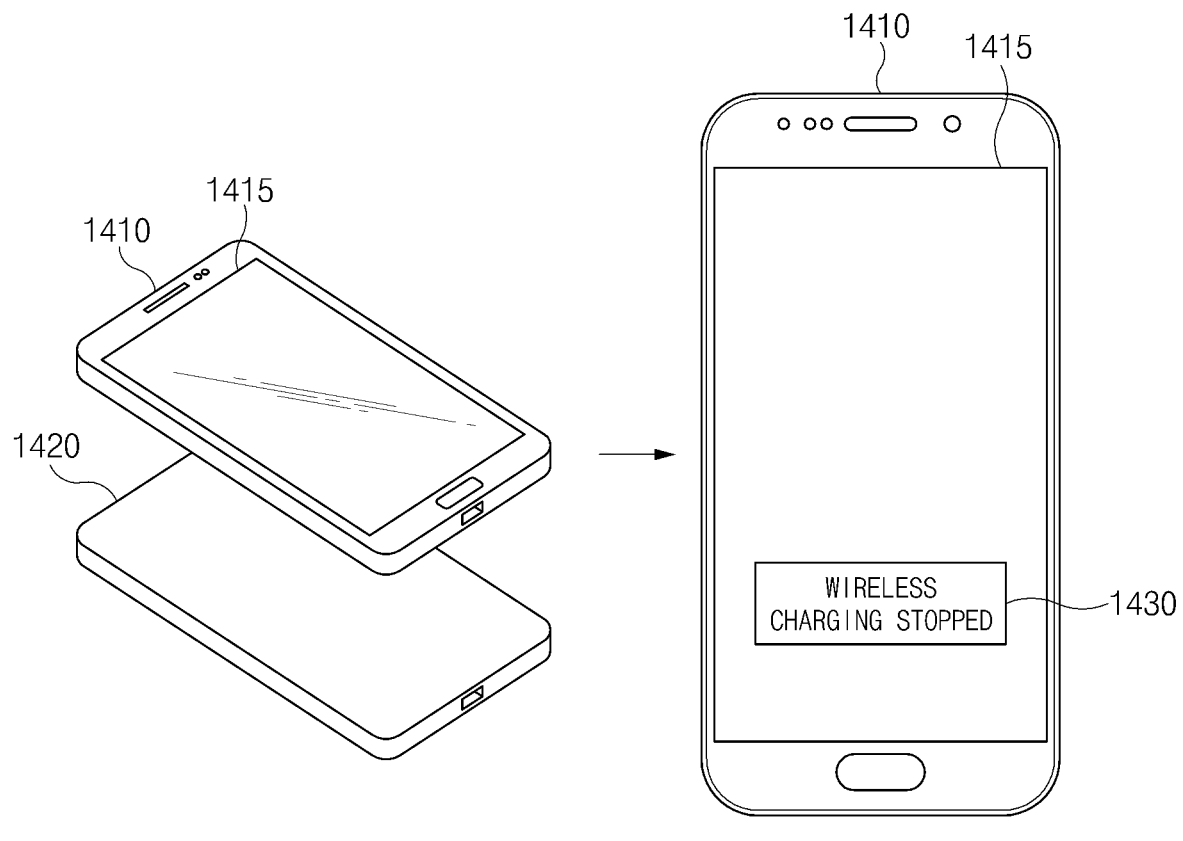
FIG. 14A and FIG. 14B are views illustrating a case where wireless charging is stopped in a first electronic device and a second electronic device according to one embodiment.

FIGS. 14A and 14B are views illustrating a case where wireless charging is stopped in a first electronic device and a second electronic device according to one embodiment.

Referring to FIG. 14A, the first electronic device 1410 may be wirelessly charging the second electronic device 1420. As explained above, to perform the wireless charging, the rear surface of the first electronic device 1410 and the rear surface of the second electronic device 1420 may be placed close to each other and face each other. For example, the first electronic device 1410 may supply power to the second electronic device 1420.

According to one embodiment, the display 1415 of the first electronic device 1410 may display information associated with wireless charging between the first electronic device 1410 and the second electronic device 1420. In the case where targeted wireless charging is completed, the first electronic device 1410 and the second electronic device 1420 may stop wireless charging. However, the wireless charging may be also stopped before the completion of the targeted wireless charging. For example, if the first electronic device 1410 and the second electronic device 1420 are separated by a distance that is larger than a pre-defined distance, the wireless charging may be stopped.

Referring to FIG. 14B, when the wireless charging of the first electronic device 1410 and the second electronic device 1420 is stopped, the first electronic device 1410 or the second electronic device 1420 may display a third user interface 1430 indicating that the wireless charging is stopped. The third user interface 1430 may sequentially or simultaneously display, for example, the amount of power that the second electronic device 1420 has received or the current battery capacity of the second electronic device 1420. Accordingly, the user may use this information to decide whether to resume the wireless charging or to stop the wireless charging.

According to one embodiment, if the wireless charging is stopped as described above, the first electronic device 1410 and the second electronic device 1420 may delete the exchanged information related to the wireless charging.

The term "module" used in this disclosure may include a unit composed of hardware, software and firmware and may be interchangeably used with the terms "unit," "logic," "logical block," "component," or "circuit." The "module" may be implemented mechanically or electronically and may include at least one of an application-specific IC (ASIC) chip, a field-programmable gate array (FPGA), and a programmable-logic device for performing some operations, which are known or will be developed. At least a part of an apparatus (e.g., modules or functions thereof) or a method (e.g., operations) according to various embodiments may be, for example, implemented by instructions stored in computer-readable storage media (e.g., the memory 130) in the form of a program module. The instruction, when executed by a processor (e.g., the processor 120), may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and an internal memory. Also, a program instruction may include not only mechanical code such as those generated by a compiler but also high-level language code executable on a computer using an interpreter. A module or a program module according to various embodiments may include at least one of the above elements, or a part of the above elements may be omitted, or other elements may be further included. Operations performed by a module, a program module, or other elements according to various embodiments may be executed sequentially, in parallel, repeatedly, or in a heuristic method or some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device comprising:
    a display;
    a charging circuit configured to transmit and receive power to and from an external electronic device;
    a sensor circuit, including a gyro sensor, configured to detect whether the electronic device is facing away from a surface of an external object such that the display is visible to a user or facing toward the surface such that the display is obscured from the user by the surface of the external object; and
    a processor electrically connected with the display, the charging circuit, and the sensor circuit,
    wherein, when wirelessly transmitting or receiving power to or from the external electronic device using the charging circuit, the processor is configured to:
        receive information associated with the wireless transmission of power to the external electronic device or wireless reception of power from the external electronic device;
        determine whether a front surface containing the display faces a top side or a bottom side opposite to the top side by using the gyro sensor;
        determine the electronic device is detected to be facing away from the surface of the external object when the gyro sensor satisfies a specific condition; and
        display a user interface according to the information associated with the wireless transmission of power to the external electronic device or wireless reception of power from the external electronic device when the gyro sensor satisfies the specific condition.

2. The electronic device of claim 1, wherein the information includes at least one of a battery level of the electronic device, an amount of power consumed by the electronic device, a temperature of the electronic device, when the wireless transmission or reception of power started, an estimated time for completing the wireless transmission or reception of power, a charging current of the electronic device, and time elapsed since a start of the wireless transmission or reception of power.

3. The electronic device of claim 1, wherein the displayed user interface includes information generated by the electronic device and information received from the external electronic device.

4. The electronic device of claim 1, wherein a first frequency used to wirelessly transmit or receive power is different from a second frequency used to transmit and receive the information.

5. The electronic device of claim 1, wherein the processor is further configured to not display the user interface if the electronic device is detected to be facing toward the surface.

6. The electronic device of claim 1, wherein, if the electronic device transmits power to the external electronic device, the processor is further configured to execute only a pre-defined application.

7. The electronic device of claim 1, wherein, if the electronic device transmits power to the external electronic device, the processor is further configured to enter a low-power mode to execute only one or more pre-defined functions.

8. The electronic device of claim 1, wherein, if the electronic device transmits power to the external electronic device, the processor is further configured to display, in the display, a first user interface displaying at least one of a current power capacity of the electronic device, a target capacity remaining after the wireless transmission of power is completed, a progress indicator, and an estimated time remaining for the wireless transmission of power.

9. The electronic device of claim 1, wherein, if the electronic device receives power from the external electronic device, the processor is further configured to display, in the display, a second user interface displaying at least one of a current power capacity of the external electronic device, a target capacity remaining after the wireless transmission of power is completed, and an estimated time remaining for the wireless transmission of power.

10. The electronic device of claim 9, wherein the processor is further configured to adjust the target capacity based on an input from the user.

11. A control method of an electronic device including a display, the method comprising:
wirelessly transmitting or receiving power to or from an external electronic device;
detecting whether the electronic device is facing away from a surface of an external object such that the display is visible to a user or facing toward the surface such that the display is obscured from the user by the surface of the external object by using a gyro sensor;
receiving information associated with the wireless transmission of power to the external electronic device or wireless reception of power from the external electronic device; and
determining the electronic device is detected to be facing away from the surface of the external object when the gyro sensor satisfies a specific condition; and
displaying a user interface according to the information associated with the wireless transmission of power to the external electronic device or wireless reception of power from the external electronic device when the gyro sensor satisfies the specific condition.

12. The method of claim 11, wherein the information includes at least one of a battery level of the electronic device, an amount of power consumed by the electronic device, a temperature of the electronic device, when the wireless transmission or reception of power started, an estimated time for completing the wireless transmission or reception of power, a charging current of the electronic device, and time elapsed since a start of the wireless transmission or reception of power.

13. The method of claim 11, wherein the displayed user interface includes information generated by the electronic device and information received from the external electronic device.

14. The method of claim 11, wherein the method includes:
not displaying the user interface if the electronic device is detected to be facing toward the surface.

15. The method of claim 11, wherein, if the electronic device transmits power to the external electronic device, the method further comprises:
executing only a pre-defined application.

16. The method of claim 11, wherein, if the electronic device transmits power to the external electronic device, the method further comprises:
entering a low-power mode to execute only one or more pre-defined functions.

17. The method of claim 11, wherein, if the electronic device transmits power to the external electronic device, the method further comprises:
displaying, in the display, a first user interface displaying at least one of a current power capacity of the electronic device, a target capacity remaining after the wireless transmission of power is completed, a progress indicator, and an estimated time remaining for the wireless transmission of power.

18. The method of claim 11, wherein, if the electronic device receives power from the external electronic device, the method further comprises:
displaying, in the display, a second user interface displaying at least one of a current power capacity of the external electronic device, a target capacity remaining after the wireless transmission of power is completed, and an estimated time remaining for the wireless transmission of power.

19. The method of claim 18, wherein the method includes:
adjusting the target capacity based on an input from the user.

20. A recording medium storing instructions for an electronic device including a display, the instructions, when executed by a processor of the electronic device, perform a method of:
wirelessly transmitting or receiving power to or from an external electronic device;
detecting whether the electronic device is facing away from a surface of an external object such that the display is visible to a user or facing toward the surface such that the display is obscured from the user by the surface of the external object by using a gyro sensor;
receiving information associated with the wireless transmission of power to the external electronic device or wireless reception of power from the external electronic device; and
determining the electronic device is detected to be facing away from the surface of the external object when the gyro sensor satisfies a specific condition; and
displaying a user interface according to the information associated with the wireless transmission of power to the external electronic device or wireless reception of power from the external electronic device when the gyro sensor satisfies the specific condition.

* * * * *